(12) United States Patent
Chen et al.

(10) Patent No.: US 9,374,513 B2
(45) Date of Patent: Jun. 21, 2016

(54) MOBILE DEVICE AND OPTICAL IMAGING LENS THEREOF

(71) Applicant: GeniuS Electronic Optical Co., Ltd., Taichung (TW)

(72) Inventors: Shih-Han Chen, Taichung (TW); Hua Bin Liao, Fujian (CN); Yu-Rong Wu, Fujian (CN)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 18 days.

(21) Appl. No.: 14/497,555

(22) Filed: Sep. 26, 2014

(65) Prior Publication Data

US 2015/0350503 A1     Dec. 3, 2015

(30) Foreign Application Priority Data

May 29, 2014 (CN) .......................... 2014 1 0234792

(51) Int. Cl.
| | |
|---|---|
| G02B 3/02 | (2006.01) |
| H04N 5/225 | (2006.01) |
| G02B 9/62 | (2006.01) |
| G02B 13/00 | (2006.01) |

(52) U.S. Cl.
CPC ............... *H04N 5/2254* (2013.01); *G02B 9/62* (2013.01); *G02B 13/0045* (2013.01); *H04N 5/2252* (2013.01); *H04N 5/2253* (2013.01)

(58) Field of Classification Search
CPC .................................................. G02B 13/0045
USPC .......................................................... 359/713
See application file for complete search history.

(56) References Cited

U.S. PATENT DOCUMENTS

| | | | |
|---|---|---|---|
| 7,046,452 | B2 | 5/2006 | Ori |
| 7,164,539 | B2 | 1/2007 | Tomioka |
| 7,215,487 | B2 | 5/2007 | Ori |
| 7,586,691 | B2 | 9/2009 | Noda |
| 7,663,814 | B2 | 2/2010 | Kitahara |
| 8,040,618 | B2 | 10/2011 | Kitahara |
| 2013/0050846 | A1 | 2/2013 | Huang |
| 2013/0329306 | A1 | 12/2013 | Tsai et al. |
| 2015/0338607 | A1* | 11/2015 | Liao .......................... G02B 9/62 359/713 |

FOREIGN PATENT DOCUMENTS

| | | |
|---|---|---|
| TW | M354744 | 4/2009 |
| TW | M357610 | 5/2009 |
| TW | 201011337 | 3/2010 |
| TW | 201300872 | 1/2013 |
| TW | 201326883 | 7/2013 |

* cited by examiner

*Primary Examiner* — James Jones
(74) *Attorney, Agent, or Firm* — Baker & McKenzie LLP

(57) ABSTRACT

The present invention provides a mobile device and an optical imaging lens thereof. The optical imaging lens comprises six lens elements positioned in an order from an object side to an image side and an aperture stop positioned between the second and the third lens elements. Through controlling the convex or concave shape of the surfaces of the lens elements and designing parameters satisfying at least one inequality, the optical imaging lens shows better optical characteristics and the total length of the optical imaging lens is shortened.

20 Claims, 39 Drawing Sheets

| f(Focus)= 2.228mm, HFOV(Half angular field of view)= 60.00deg., Fno= 2.4, System length= 4.045mm ||||||||
|---|---|---|---|---|---|---|---|
| Surface # | | Radius | Thickness | Refractive index | Abbe number | Focus | Material |
| - | Object | ∞ | ∞ | | | | |
| 111 | 1st lens element | 30.7068 | 0.2510_T1 | 1.640_n1 | 23.529_v1 | -34.192_f1 | plastic |
| 112 | | 12.7894 | 0.6610_G12 | | | | |
| 121 | 2nd lens element | 11.5613 | 0.2570_T2 | 1.535_n2 | 55.712_v2 | 36.887_f2 | plastic |
| 122 | | 27.5678 | 0.1380_G23-TA | | | | |
| 100 | Aperture stop | ∞ | -0.0100_TA | | | | |
| 131 | 3rd lens element | 2.2140 | 0.4930_T3 | 1.544_n3 | 56.114_v3 | 1.490_f3 | plastic |
| 132 | | -1.1843 | 0.1320_G34 | | | | |
| 141 | 4th lens element | -405.1487 | 0.2610_T4 | 1.640_n4 | 23.529_v4 | -2.337_f4 | plastic |
| 142 | | 1.5122 | 0.1180_G45 | | | | |
| 151 | 5th lens element | 1.8175 | 0.2790_T5 | 1.535_n5 | 55.712_v5 | 7.737_f5 | plastic |
| 152 | | 3.0584 | 0.3160_G56 | | | | |
| 161 | 6th lens element | 5.2674 | 0.3290_T6 | 1.531_n6 | 55.744_v6 | -13.199_f6 | plastic |
| 162 | | 2.9464 | 0.2000_G6F | | | | |
| 171 | IR cut filter | ∞ | 0.2100_TF | 1.517 | 64.167 | | |
| 172 | | ∞ | 0.4100_GFP | | | | |
| 180 | Image plane | ∞ | | | | | |

FIG. 4

| Aspherical parameters | | | | | | |
|---|---|---|---|---|---|---|
| Surface # | 112 | 121 | 122 | 131 | 132 | 141 |
| K | -4.7871E+02 | -1.5010E+03 | 1.5955E+03 | 4.7188E-01 | 1.9418E-02 | 2.3563E+05 |
| $a_4$ | 8.3491E-02 | -1.4769E-02 | -2.1059E-01 | -1.6558E-01 | 2.6828E-01 | 1.0639E-01 |
| $a_6$ | 1.8064E-02 | -4.3934E-01 | -3.1021E-01 | 3.3299E-01 | -1.5765E-01 | -8.1621E-01 |
| $a_8$ | 7.4853E-03 | 4.2012E-01 | 1.2804E+00 | 4.6558E-02 | -5.8673E-01 | 6.8832E-01 |
| $a_{10}$ | 0.0000E+00 | 0.0000E+00 | 0.0000E+00 | 8.4069E-01 | 5.3640E-01 | 2.0828E-02 |
| $a_{12}$ | 0.0000E+00 | 0.0000E+00 | 0.0000E+00 | 7.2937E-02 | 4.3754E+00 | 3.9463E-02 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 142 | 151 | 152 | 161 | 162 | |
| K | -2.0526E-02 | -6.5532E-02 | -3.1787E-02 | 6.3781E+00 | 0.0000E+00 | |
| $a_4$ | -1.9661E-01 | -1.1670E-01 | 7.3503E-04 | -6.8018E-02 | -1.0610E-01 | |
| $a_6$ | -1.0808E-01 | 3.1061E-02 | -4.4201E-02 | 5.1650E-03 | -8.7341E-03 | |
| $a_8$ | 1.5259E-01 | -3.8344E-02 | -6.5127E-04 | 4.5630E-03 | 6.6187E-03 | |
| $a_{10}$ | -1.0899E-01 | -1.5456E-03 | -1.2376E-04 | 1.3144E-03 | 1.3750E-03 | |
| $a_{12}$ | 1.0097E-02 | -3.8227E-03 | 8.2239E-04 | 1.7477E-04 | -5.1010E-06 | |
| $a_{14}$ | 0.0000E+00 | 0.0000E+00 | 0.0000E+00 | -3.7363E-04 | -1.4443E-04 | |
| $a_{16}$ | 0.0000E+00 | 0.0000E+00 | 0.0000E+00 | -6.4985E-04 | 6.4260E-06 | |

FIG. 5

| \multicolumn{7}{c}{f(Focus)= 2.106mm, HFOV(Half angular field of view)= 60.00deg., Fno= 2.4, System length= 3.866mm} |
|---|---|---|---|---|---|---|

| Surface # | | Radius | Thickness | Refractive index | Abbe number | Focus | Material |
|---|---|---|---|---|---|---|---|
| - | Object | ∞ | ∞ | | | | |
| 211 | 1st lens element | 122.3758 | 0.2990_T1 | 1.640_n1 | 23.529_v1 | -157.782_f1 | plastic |
| 212 | | 55.4901 | 0.2310_G12 | | | | |
| 221 | 2nd lens element | -25.8877 | 0.2540_T2 | 1.535_n2 | 55.712_v2 | -61.595_f2 | plastic |
| 222 | | -119.6832 | 0.2070_G23-TA | | | | |
| 200 | Aperture stop | ∞ | -0.0100_TA | | | | |
| 231 | 3rd lens element | 2.2854 | 0.5030_T3 | 1.544_n3 | 56.114_v3 | 1.484_f3 | plastic |
| 232 | | -1.1571 | 0.0380_G34 | | | | |
| 241 | 4th lens element | 31.1419 | 0.3440_T4 | 1.640_n4 | 23.529_v4 | -2.512_f4 | plastic |
| 242 | | 1.5325 | 0.0940_G45 | | | | |
| 251 | 5th lens element | 2.1750 | 0.5390_T5 | 1.535_n5 | 55.712_v5 | 7.583_f5 | plastic |
| 252 | | 4.2663 | 0.0560_G56 | | | | |
| 261 | 6th lens element | 4.6341 | 0.5070_T6 | 1.531_n6 | 55.744_v6 | -28.530_f6 | plastic |
| 262 | | 3.4165 | 0.2000_G6F | | | | |
| 271 | IR cut filter | ∞ | 0.2100_TF | 1.517 | 64.167 | | |
| 272 | | ∞ | 0.3940_GFP | | | | |
| 280 | Image plane | ∞ | | | | | |

FIG. 8

| Aspherical parameters | | | | | | |
|---|---|---|---|---|---|---|
| Surface # | 212 | 221 | 222 | 231 | 232 | 241 |
| K | 0.0000E+00 | 0.0000E+00 | 0.0000E+00 | 0.0000E+00 | 0.0000E+00 | 0.0000E+00 |
| $a_4$ | 1.5409E-01 | -1.2015E-02 | -2.3493E-01 | -1.8087E-01 | 2.5681E-01 | 9.7663E-02 |
| $a_6$ | 3.6326E-02 | -4.2724E-01 | -3.7602E-01 | 3.8872E-01 | -1.5649E-01 | -8.1660E-01 |
| $a_8$ | 1.1572E-02 | 4.6709E-01 | 1.3975E+00 | 1.7527E-01 | -5.3038E-01 | 6.9370E-01 |
| $a_{10}$ | 5.9771E-03 | -8.0582E-03 | 3.6389E-02 | 9.7687E-01 | 6.1596E-01 | 4.0098E-02 |
| $a_{12}$ | -1.3729E-02 | -4.1899E-03 | 2.6005E-01 | -1.7207E-01 | 4.4735E+00 | 4.1770E-02 |
| $a_{14}$ | -5.8136E-02 | 1.5484E-02 | 9.7576E-01 | -6.7605E-01 | -5.0828E-02 | 1.0983E-02 |
| $a_{16}$ | -1.3474E-01 | 5.6867E-02 | 3.1785E+00 | -1.9239E+00 | 2.1528E-01 | -9.7109E-02 |
| Surface # | 242 | 251 | 252 | 261 | 262 | |
| K | 0.0000E+00 | 0.0000E+00 | 0.0000E+00 | 0.0000E+00 | 0.0000E+00 | |
| $a_4$ | -1.8945E-01 | -1.1425E-01 | -1.6154E-03 | -9.1592E-02 | -1.0481E-01 | |
| $a_6$ | -1.0668E-01 | 3.5433E-02 | -4.3758E-02 | 1.0454E-02 | -1.9282E-02 | |
| $a_8$ | 1.5234E-01 | -3.5921E-02 | 3.8588E-04 | 4.2300E-03 | 5.4207E-03 | |
| $a_{10}$ | -1.1539E-01 | 1.7725E-03 | 2.0023E-04 | 7.3130E-04 | 1.9539E-03 | |
| $a_{12}$ | -1.7527E-03 | 1.3461E-03 | 6.8222E-05 | -1.8022E-04 | 6.0153E-04 | |
| $a_{14}$ | -3.4071E-05 | 9.3898E-04 | -2.5990E-06 | -4.8432E-04 | 2.4540E-04 | |
| $a_{16}$ | 3.1186E-03 | 7.3517E-04 | -5.8117E-05 | -6.0053E-04 | 2.1564E-04 | |

FIG. 9

| f(Focus)= 2.146mm, HFOV(Half angular field of view)= 60.00deg., Fno= 2.4, System length= 3.812mm ||||||||
|---|---|---|---|---|---|---|---|
| Surface # | | Radius | Thickness | Refractive index | Abbe number | Focus | Material |
| - | Object | ∞ | ∞ | | | | |
| 311 | 1st lens element | 590.7035 | 0.2510_T1 | 1.640_n1 | 23.529_v1 | -113.993_f1 | plastic |
| 312 | | 65.3383 | 0.2090_G12 | | | | |
| 321 | 2nd lens element | 521.3015 | 0.2500_T2 | 1.535_n2 | 55.712_v2 | -68.284_f2 | plastic |
| 322 | | 34.2410 | 0.2030_G23-TA | | | | |
| 300 | Aperture stop | ∞ | -0.0100_TA | | | | |
| 331 | 3rd lens element | 2.2995 | 0.5070_T3 | 1.544_n3 | 56.114_v3 | 1.491_f3 | plastic |
| 332 | | -1.1622 | 0.0610_G34 | | | | |
| 341 | 4th lens element | 32.2063 | 0.2950_T4 | 1.640_n4 | 23.529_v4 | -2.481_f4 | plastic |
| 342 | | 1.5183 | 0.0960_G45 | | | | |
| 351 | 5th lens element | 2.1851 | 0.5480_T5 | 1.535_n5 | 55.712_v5 | 7.869_f5 | plastic |
| 352 | | 4.1308 | 0.0550_G56 | | | | |
| 361 | 6th lens element | 4.5033 | 0.5080_T6 | 1.531_n6 | 55.744_v6 | -51.643_f6 | plastic |
| 362 | | 3.7183 | 0.2000_G6F | | | | |
| 371 | IR cut filter | ∞ | 0.2100_TF | 1.517 | 64.167 | | |
| 372 | | ∞ | 0.4290_GFP | | | | |
| 380 | Image plane | ∞ | | | | | |

FIG. 12

| Aspherical parameters | | | | | | |
|---|---|---|---|---|---|---|
| Surface # | 312 | 321 | 322 | 331 | 332 | 341 |
| K | 0.0000E+00 | 0.0000E+00 | 0.0000E+00 | 0.0000E+00 | 0.0000E+00 | 0.0000E+00 |
| $a_4$ | 1.5659E-01 | -8.7194E-03 | -2.4142E-01 | -1.7829E-01 | 2.6348E-01 | 1.0695E-01 |
| $a_6$ | 3.9436E-02 | -4.2967E-01 | -3.7207E-01 | 3.8996E-01 | -1.4293E-01 | -8.1955E-01 |
| $a_8$ | 1.1050E-02 | 4.6273E-01 | 1.4016E+00 | 1.8633E-01 | -5.2373E-01 | 6.8070E-01 |
| $a_{10}$ | 2.9422E-03 | -5.1782E-03 | 2.4157E-02 | 9.9414E-01 | 6.2397E-01 | 1.2231E-02 |
| $a_{12}$ | -1.1088E-02 | -6.3077E-03 | 1.5981E-01 | -1.9576E-01 | 4.4780E+00 | 1.6396E-02 |
| $a_{14}$ | -4.1923E-02 | 1.3700E-03 | 6.2386E-01 | -9.8586E-01 | -7.4445E-02 | 1.6786E-02 |
| $a_{16}$ | -9.3625E-02 | 1.8214E-02 | 2.0302E+00 | -3.9438E+00 | -1.5801E-01 | 1.6950E-02 |
| Surface # | 342 | 351 | 352 | 361 | 362 | |
| K | 0.0000E+00 | 0.0000E+00 | 0.0000E+00 | 0.0000E+00 | 0.0000E+00 | |
| $a_4$ | -1.9245E-01 | -1.1457E-01 | 7.7466E-04 | -9.0045E-02 | -1.0497E-01 | |
| $a_6$ | -1.0688E-01 | 3.4476E-02 | -4.3499E-02 | 9.9831E-03 | -1.8941E-02 | |
| $a_8$ | 1.5482E-01 | -3.7053E-02 | 4.3114E-04 | 4.3421E-03 | 4.9578E-03 | |
| $a_{10}$ | -1.1332E-01 | 4.6301E-04 | 1.7683E-04 | 8.2915E-04 | 1.5619E-03 | |
| $a_{12}$ | -7.4479E-04 | 4.0743E-04 | 4.6802E-05 | -1.1650E-04 | 3.7249E-04 | |
| $a_{14}$ | -6.7944E-04 | 3.9483E-04 | -1.3453E-05 | -4.6067E-04 | 1.2785E-04 | |
| $a_{16}$ | -7.3199E-04 | 4.1597E-04 | -3.5645E-05 | -6.0381E-04 | 1.6792E-04 | |

FIG. 13

| \multicolumn{7}{c|}{f(Focus)= 2.110mm, HFOV(Half angular field of view)= 60.00deg., Fno= 2.4, System length= 3.935mm} | | | | | | |
|---|---|---|---|---|---|---|---|
| Surface # | | Radius | Thickness | Refractive index | Abbe number | Focus | Material |
| - | Object | ∞ | ∞ | | | | |
| 411 | 1st lens element | 35.9434 | 0.2500_T1 | 1.640_n1 | 23.529_v1 | -69.703_f1 | plastic |
| 412 | | 19.9141 | 0.1300_G12 | | | | |
| 421 | 2nd lens element | 65.6558 | 0.4990_T2 | 1.535_n2 | 55.712_v2 | -79.471_f2 | plastic |
| 422 | | 25.7896 | 0.1120_G23-TA | | | | |
| 400 | Aperture stop | ∞ | -0.0100_TA | | | | |
| 431 | 3rd lens element | 2.5367 | 0.4910_T3 | 1.544_n3 | 56.114_v3 | 1.535_f3 | plastic |
| 432 | | -1.1657 | 0.0930_G34 | | | | |
| 441 | 4th lens element | 33.9137 | 0.2540_T4 | 1.640_n4 | 23.529_v4 | -2.694_f4 | plastic |
| 442 | | 1.6469 | 0.0600_G45 | | | | |
| 451 | 5th lens element | 1.9233 | 0.3110_T5 | 1.535_n5 | 55.712_v5 | 7.939_f5 | plastic |
| 452 | | 3.3073 | 0.1000_G56 | | | | |
| 461 | 6th lens element | 4.7425 | 1.0090_T6 | 1.531_n6 | 55.744_v6 | -28.803_f6 | plastic |
| 462 | | 3.3551 | 0.2000_G6F | | | | |
| 471 | IR cut filter | ∞ | 0.2100_TF | 1.517 | 64.167 | | |
| 472 | | ∞ | 0.2260_GFP | | | | |
| 480 | Image plane | ∞ | | | | | |

FIG. 16

| Aspherical parameters | | | | | | |
|---|---|---|---|---|---|---|
| Surface # | 412 | 421 | 422 | 431 | 432 | 441 |
| K | -1.6214E+03 | 6.8913E+03 | 1.1322E+03 | -4.5012E-01 | -2.1072E-02 | -7.9805E+01 |
| $a_4$ | 1.5136E-01 | 8.9129E-04 | -2.4052E-01 | -1.8268E-01 | 2.6905E-01 | 1.0734E-01 |
| $a_6$ | 3.2041E-02 | -4.2412E-01 | -3.2970E-01 | 3.6347E-01 | -1.5343E-01 | -8.1908E-01 |
| $a_8$ | -4.0259E-02 | 4.7612E-01 | 1.5451E+00 | 1.6255E-01 | -7.0396E-01 | 6.8677E-01 |
| $a_{10}$ | -1.8016E-02 | -3.4903E-02 | 6.7982E-01 | 1.4843E+00 | 5.8057E-02 | 1.2108E-02 |
| $a_{12}$ | 4.4658E-04 | -2.1034E-01 | 1.2178E+00 | 1.6696E+00 | 6.5955E+00 | 3.8004E-02 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 442 | 451 | 452 | 461 | 462 | |
| K | 7.0509E-02 | 1.1013E-01 | -2.4363E+00 | -2.0301E+00 | 2.0926E+00 | |
| $a_4$ | -1.9539E-01 | -1.1093E-01 | -6.6237E-03 | -8.9416E-02 | -6.3580E-02 | |
| $a_6$ | -1.0464E-01 | 3.5568E-02 | -4.9013E-02 | 1.5207E-02 | -2.2056E-02 | |
| $a_8$ | 1.4906E-01 | -4.3224E-02 | -1.1988E-03 | 5.7851E-03 | 2.4055E-03 | |
| $a_{10}$ | -1.1238E-01 | -5.3302E-03 | -2.6938E-04 | 1.6281E-03 | 7.6300E-04 | |
| $a_{12}$ | 3.4754E-03 | -7.4283E-03 | -1.8109E-04 | 3.1270E-04 | 1.6073E-05 | |
| $a_{14}$ | 0.0000E+00 | 0.0000E+00 | 0.0000E+00 | -5.2432E-04 | -4.1457E-05 | |
| $a_{16}$ | 0.0000E+00 | 0.0000E+00 | 0.0000E+00 | -8.7116E-04 | 7.6882E-05 | |

FIG. 17

| f(Focus)= 1.913mm, HFOV(Half angular field of view)= 60.00deg., Fno= 2.4, System length= 3.639mm ||||||||
|---|---|---|---|---|---|---|---|
| Surface # | | Radius | Thickness | Refractive index | Abbe number | Focus | Material |
| - | Object | ∞ | ∞ | | | | |
| 511 | 1st lens element | 80.6835 | 0.2530_T1 | 1.640_n1 | 23.529_v1 | -68.613_f1 | plastic |
| 512 | | 28.5326 | 0.4100_G12 | | | | |
| 521 | 2nd lens element | -21.2965 | 0.2510_T2 | 1.535_n2 | 55.712_v2 | 192.357_f2 | plastic |
| 522 | | -17.7277 | 0.0480_G23-TA | | | | |
| 500 | Aperture stop | ∞ | -0.0100_TA | | | | |
| 531 | 3rd lens element | 2.2078 | 0.5030_T3 | 1.544_n3 | 56.114_v3 | 1.472_f3 | plastic |
| 532 | | -1.1620 | 0.0580_G34 | | | | |
| 541 | 4th lens element | 43.2317 | 0.3750_T4 | 1.640_n4 | 23.529_v4 | -2.588_f4 | plastic |
| 542 | | 1.6008 | 0.0820_G45 | | | | |
| 551 | 5th lens element | 1.9912 | 0.5350_T5 | 1.535_n5 | 55.712_v5 | 6.505_f5 | plastic |
| 552 | | 4.1988 | 0.0500_G56 | | | | |
| 561 | 6th lens element | 4.8004 | 0.3740_T6 | 1.531_n6 | 55.744_v6 | -24.304_f6 | plastic |
| 562 | | 3.4073 | 0.2000_G6F | | | | |
| 571 | IR cut filter | ∞ | 0.2100_TF | 1.517 | 64.167 | | |
| 572 | | ∞ | 0.3000_GFP | | | | |
| 580 | Image plane | ∞ | | | | | |

FIG. 20

| Aspherical parameters | | | | | | |
|---|---|---|---|---|---|---|
| Surface # | 512 | 521 | 522 | 531 | 532 | 541 |
| K | 2.8651E+01 | 3.2979E+00 | 1.1752E+02 | -3.3945E-02 | -1.0546E-02 | -7.6307E+03 |
| $a_4$ | 1.3250E-01 | -1.3820E-02 | -2.2513E-01 | -1.8821E-01 | 2.5719E-01 | 9.2548E-02 |
| $a_6$ | 2.9952E-02 | -4.3041E-01 | -3.6448E-01 | 3.7379E-01 | -1.7472E-01 | -8.2045E-01 |
| $a_8$ | 2.0101E-02 | 4.4271E-01 | 1.4725E+00 | 1.5250E-01 | -5.6274E-01 | 6.4748E-01 |
| $a_{10}$ | 5.6698E-02 | -1.2892E-01 | 9.1846E-02 | 9.3584E-01 | 6.1283E-01 | -2.0149E-01 |
| $a_{12}$ | 1.1306E-01 | -5.1623E-01 | -5.3604E-01 | 4.4948E-01 | 4.0568E+00 | -6.5691E-01 |
| $a_{14}$ | 7.8778E-02 | -1.9990E+00 | -5.1466E+00 | 2.9874E+00 | -2.3694E+00 | -5.2306E-01 |
| $a_{16}$ | 3.2308E-03 | -6.5346E+00 | -1.5391E+01 | 1.6187E+01 | -1.0522E+01 | -1.5997E+00 |
| Surface # | 542 | 551 | 552 | 561 | 562 | |
| K | -5.9301E-03 | -3.2322E-01 | -3.5229E-01 | 6.3132E-01 | 9.1063E-01 | |
| $a_4$ | -1.8934E-01 | -1.2004E-01 | 7.8321E-05 | -9.3686E-02 | -1.0028E-01 | |
| $a_6$ | -1.0416E-01 | 1.7556E-02 | -4.5940E-02 | 1.0410E-02 | -1.8185E-02 | |
| $a_8$ | 1.3870E-01 | -4.7622E-02 | -5.7964E-04 | 4.6525E-03 | 5.3333E-03 | |
| $a_{10}$ | -1.2525E-01 | -4.6621E-03 | -6.4508E-04 | 1.1531E-03 | 1.7219E-03 | |
| $a_{12}$ | 1.3998E-03 | -6.2633E-04 | -6.3259E-04 | 2.9241E-04 | 5.7452E-04 | |
| $a_{14}$ | 4.3997E-03 | 4.2553E-03 | -2.7795E-04 | -2.0545E-04 | 3.2364E-04 | |
| $a_{16}$ | -1.9419E-03 | 1.2382E-02 | -5.0535E-05 | -4.4195E-04 | 3.8152E-04 | |

FIG. 21

| \multicolumn{7}{|c|}{f(Focus)= 2.043mm, HFOV(Half angular field of view)= 60.00deg., Fno= 2.4, System length= 4.555mm} | | | | | | |
|---|---|---|---|---|---|---|---|
| Surface # | | Radius | Thickness | Refractive index | Abbe number | Focus | Material |
| - | Object | ∞ | ∞ | | | | |
| 611 | 1st lens element | 35.0476 | 1.0510_T1 | 1.640_n1 | 23.529_v1 | -118.119_f1 | plastic |
| 612 | | 23.7179 | 0.1590_G12 | | | | |
| 621 | 2nd lens element | 60.9807 | 0.4940_T2 | 1.535_n2 | 55.712_v2 | -190.993_f2 | plastic |
| 622 | | 38.1292 | 0.1700_G23-TA | | | | |
| 600 | Aperture stop | ∞ | -0.0100_TA | | | | |
| 631 | 3rd lens element | 2.3487 | 0.4980_T3 | 1.544_n3 | 56.114_v3 | 1.490_f3 | plastic |
| 632 | | -1.1513 | 0.0630_G34 | | | | |
| 641 | 4th lens element | 22.1897 | 0.2800_T4 | 1.640_n4 | 23.529_v4 | -2.791_f4 | plastic |
| 642 | | 1.6557 | 0.1300_G45 | | | | |
| 651 | 5th lens element | 2.3313 | 0.3540_T5 | 1.535_n5 | 55.712_v5 | 7.949_f5 | plastic |
| 652 | | 4.8666 | 0.0060_G56 | | | | |
| 661 | 6th lens element | 3.9022 | 0.3550_T6 | 1.531_n6 | 55.744_v6 | -61.827_f6 | plastic |
| 662 | | 3.3786 | 0.2000_G6F | | | | |
| 671 | IR cut filter | ∞ | 0.2100_TF | 1.517 | 64.167 | | |
| 672 | | ∞ | 0.5950_GFP | | | | |
| 680 | Image plane | ∞ | | | | | |

FIG. 24

| Aspherical parameters | | | | | | |
|---|---|---|---|---|---|---|
| Surface # | 612 | 621 | 622 | 631 | 632 | 641 |
| K | -3.9470E+02 | 6.7264E+03 | 2.9457E+03 | -7.7783E-02 | -6.3798E-03 | -1.1899E+03 |
| $a_4$ | 1.5369E-01 | -9.1724E-04 | -2.3152E-01 | -1.7763E-01 | 2.6858E-01 | 1.0752E-01 |
| $a_6$ | -5.0452E-04 | -4.2717E-01 | -3.2302E-01 | 3.7474E-01 | -1.3596E-01 | -8.2504E-01 |
| $a_8$ | -6.7218E-02 | 4.4380E-01 | 1.5464E+00 | 1.9178E-01 | -5.2471E-01 | 6.6504E-01 |
| $a_{10}$ | 1.2915E-02 | -1.2087E-01 | 4.9682E-01 | 1.3223E+00 | 6.3986E-01 | 1.9844E-03 |
| $a_{12}$ | 9.5540E-02 | -1.8678E-01 | 1.2981E-01 | 2.7923E+00 | 4.6901E+00 | -1.1818E-02 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 642 | 651 | 652 | 661 | 662 | |
| K | 2.0246E-02 | -5.0365E-01 | -2.6206E+00 | -1.3046E-01 | -2.1683E-01 | |
| $a_4$ | -1.9402E-01 | -1.2444E-01 | -2.8957E-03 | -8.4668E-02 | -1.2305E-01 | |
| $a_6$ | -1.0558E-01 | 2.5988E-02 | -4.5069E-02 | 1.1617E-02 | -1.4683E-02 | |
| $a_8$ | 1.5055E-01 | -4.1889E-02 | 7.7948E-04 | 4.4779E-03 | 6.8732E-03 | |
| $a_{10}$ | -1.1308E-01 | -4.2140E-03 | 5.2360E-04 | 1.0163E-03 | 1.8678E-03 | |
| $a_{12}$ | -7.3565E-04 | -2.8013E-03 | -1.3983E-04 | 1.7783E-04 | 2.7806E-04 | |
| $a_{14}$ | 0.0000E+00 | 0.0000E+00 | 0.0000E+00 | -3.2882E-04 | 6.6251E-05 | |
| $a_{16}$ | 0.0000E+00 | 0.0000E+00 | 0.0000E+00 | -5.3791E-04 | 5.6810E-05 | |

FIG. 25

| f(Focus)= 2.232mm, HFOV(Half angular field of view)= 70.00deg., Fno= 2.4, System length= 4.13mm ||||||||
|---|---|---|---|---|---|---|---|
| Surface # | | Radius | Thickness | Refractive index | Abbe number | Focus | Material |
| - | Object | ∞ | ∞ | | | | |
| 711 | 1st lens element | 551.9582 | 0.3000_T1 | 1.640_n1 | 23.529_v1 | -44.873_f1 | plastic |
| 712 | | 27.4781 | 0.2490_G12 | | | | |
| 721 | 2nd lens element | -3.7396 | 0.5290_T2 | 1.535_n2 | 55.712_v2 | 18.501_f2 | plastic |
| 722 | | -2.8510 | 0.0610_G23-TA | | | | |
| 700 | Aperture stop | ∞ | -0.0300_TA | | | | |
| 731 | 3rd lens element | 2.3983 | 0.6160_T3 | 1.544_n3 | 56.114_v3 | 1.407_f3 | plastic |
| 732 | | -1.0272 | 0.1250_G34 | | | | |
| 741 | 4th lens element | -7.9673 | 0.2700_T4 | 1.640_n4 | 23.529_v4 | -2.195_f4 | plastic |
| 742 | | 1.7428 | 0.0930_G45 | | | | |
| 751 | 5th lens element | 6.8437 | 0.7180_T5 | 1.535_n5 | 55.712_v5 | 9.150_f5 | plastic |
| 752 | | -16.7637 | 0.0550_G56 | | | | |
| 761 | 6th lens element | 552.1289 | 0.3470_T6 | 1.531_n6 | 55.744_v6 | -5.299_f6 | plastic |
| 762 | | 2.8085 | 0.2000_G6F | | | | |
| 771 | IR cut filter | ∞ | 0.2100_TF | 1.517 | 64.167 | | |
| 772 | | ∞ | 0.3870_GFP | | | | |
| 780 | Image plane | ∞ | | | | | |

FIG. 28

| Aspherical parameters | | | | | | |
|---|---|---|---|---|---|---|
| Surface # | 712 | 721 | 722 | 731 | 732 | 741 |
| K | 0.0000E+00 | 0.0000E+00 | 0.0000E+00 | 0.0000E+00 | 0.0000E+00 | 0.0000E+00 |
| $a_4$ | 1.8968E-01 | 1.2871E-01 | -5.4581E-02 | -1.1047E-01 | 2.6431E-01 | -1.0250E-01 |
| $a_6$ | 3.2270E-02 | -6.7755E-01 | -5.6361E-01 | 3.2371E-01 | -5.8397E-01 | -1.3445E+00 |
| $a_8$ | -6.4052E-02 | 5.7873E-01 | 2.0562E+00 | -8.1558E-01 | -2.0200E-01 | 1.5022E+00 |
| $a_{10}$ | 0.0000E+00 | 0.0000E+00 | 0.0000E+00 | 1.9816E+00 | 1.0983E+00 | -3.6696E-01 |
| $a_{12}$ | 0.0000E+00 | 0.0000E+00 | 0.0000E+00 | 0.0000E+00 | 1.9215E+00 | -5.2411E-01 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 742 | 751 | 752 | 761 | 762 | |
| K | 0.0000E+00 | 0.0000E+00 | 0.0000E+00 | 0.0000E+00 | 0.0000E+00 | |
| $a_4$ | -2.0382E-01 | -3.9370E-03 | 6.4320E-03 | -1.0221E-01 | -2.1707E-01 | |
| $a_6$ | -1.4960E-01 | 6.8628E-02 | -6.6810E-02 | 1.7440E-02 | -3.4163E-03 | |
| $a_8$ | 3.2949E-01 | -8.9236E-02 | 1.7065E-02 | 8.9309E-03 | 1.3253E-02 | |
| $a_{10}$ | -2.4100E-01 | 0.0000E+00 | 0.0000E+00 | 2.1557E-03 | 3.3830E-03 | |
| $a_{12}$ | 0.0000E+00 | 0.0000E+00 | 0.0000E+00 | 2.5508E-04 | 8.6502E-04 | |
| $a_{14}$ | 0.0000E+00 | 0.0000E+00 | 0.0000E+00 | -7.7747E-04 | 8.9101E-05 | |
| $a_{16}$ | 0.0000E+00 | 0.0000E+00 | 0.0000E+00 | -1.9396E-04 | -6.1207E-05 | |

FIG. 29

| \multicolumn{7}{|c|}{f(Focus)= 2.205mm, HFOV(Half angular field of view)= 70.00deg., Fno= 2.4, System length= 3.942mm} |
|---|---|---|---|---|---|---|---|
| Surface # | | Radius | Thickness | Refractive index | Abbe number | Focus | Material |
| - | Object | ∞ | ∞ | | | | |
| 811 | 1st lens element | 18.0015 | 0.2970_T1 | 1.640_n1 | 23.529_v1 | -91.261_f1 | plastic |
| 812 | | 13.6943 | 0.2860_G12 | | | | |
| 821 | 2nd lens element | -5.2229 | 0.4220_T2 | 1.535_n2 | 55.712_v2 | 31.288_f2 | plastic |
| 822 | | -4.0966 | 0.1090_G23-TA | | | | |
| 800 | Aperture stop | ∞ | -0.0200_TA | | | | |
| 831 | 3rd lens element | 2.4833 | 0.5740_T3 | 1.544_n3 | 56.114_v3 | 1.418_f3 | plastic |
| 832 | | -1.0332 | 0.1220_G34 | | | | |
| 841 | 4th lens element | -9.5393 | 0.2940_T4 | 1.640_n4 | 23.529_v4 | -2.304_f4 | plastic |
| 842 | | 1.7803 | 0.1000_G45 | | | | |
| 851 | 5th lens element | 3.4196 | 0.2230_T5 | 1.535_n5 | 55.712_v5 | 14.732_f5 | plastic |
| 852 | | 5.8878 | 0.1420_G56 | | | | |
| 861 | 6th lens element | 6.1170 | 0.5660_T6 | 1.531_n6 | 55.744_v6 | -9.745_f6 | plastic |
| 862 | | 2.7182 | 0.2000_G6F | | | | |
| 871 | IR cut filter | ∞ | 0.2100_TF | 1.517 | 64.167 | | |
| 872 | | ∞ | 0.4170_GFP | | | | |
| 880 | Image plane | ∞ | | | | | |

FIG. 32

| Aspherical parameters | | | | | | |
|---|---|---|---|---|---|---|
| Surface # | 812 | 821 | 822 | 831 | 832 | 841 |
| K | 0.0000E+00 | 0.0000E+00 | 0.0000E+00 | 0.0000E+00 | 0.0000E+00 | 0.0000E+00 |
| $a_4$ | 1.8938E-01 | 1.3213E-01 | -7.1723E-02 | -1.1928E-01 | 2.6107E-01 | -5.2375E-02 |
| $a_6$ | 1.4837E-02 | -7.9195E-01 | -6.8561E-01 | 3.0980E-01 | -5.6747E-01 | -1.3380E+00 |
| $a_8$ | -1.4235E-02 | 6.9836E-01 | 1.9966E+00 | -1.0731E+00 | -2.5018E-01 | 1.5740E+00 |
| $a_{10}$ | 0.0000E+00 | 0.0000E+00 | 0.0000E+00 | 2.5089E+00 | 1.1712E+00 | -2.4493E-01 |
| $a_{12}$ | 0.0000E+00 | 0.0000E+00 | 0.0000E+00 | 0.0000E+00 | 2.7812E+00 | -1.3379E-01 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 842 | 851 | 852 | 861 | 862 | |
| K | 0.0000E+00 | 0.0000E+00 | 0.0000E+00 | 0.0000E+00 | 0.0000E+00 | |
| $a_4$ | -2.0830E-01 | -3.4458E-02 | 2.6962E-02 | -7.7902E-02 | -1.7256E-01 | |
| $a_6$ | -1.6445E-01 | 4.7788E-02 | -6.4562E-02 | 2.3577E-02 | -1.5214E-02 | |
| $a_8$ | 3.1831E-01 | -1.0288E-01 | 1.6976E-02 | 1.0237E-02 | 9.1737E-03 | |
| $a_{10}$ | -2.3523E-01 | 0.0000E+00 | 0.0000E+00 | 1.9234E-03 | 2.2972E-03 | |
| $a_{12}$ | 0.0000E+00 | 0.0000E+00 | 0.0000E+00 | -4.1596E-04 | 5.5188E-04 | |
| $a_{14}$ | 0.0000E+00 | 0.0000E+00 | 0.0000E+00 | -1.4086E-03 | 2.5425E-05 | |
| $a_{16}$ | 0.0000E+00 | 0.0000E+00 | 0.0000E+00 | -5.5311E-04 | -3.1949E-05 | |

FIG. 33

| f(Focus)= 2.086mm, HFOV(Half angular field of view)= 70.00deg., Fno= 2.4, System length= 4.351mm ||||||||
|---|---|---|---|---|---|---|---|
| Surface # | | Radius | Thickness | Refractive index | Abbe number | Focus | Material |
| - | Object | ∞ | ∞ | | | | |
| 911 | 1st lens element | 46.4159 | 0.8250_T1 | 1.640_n1 | 23.529_v1 | -109.247_f1 | plastic |
| 912 | | 27.7811 | 0.2620_G12 | | | | |
| 921 | 2nd lens element | -4.5246 | 0.4160_T2 | 1.535_n2 | 55.712_v2 | 23.024_f2 | plastic |
| 922 | | -3.4185 | 0.0960_G23-TA | | | | |
| 900 | Aperture stop | ∞ | -0.0190_TA | | | | |
| 931 | 3rd lens element | 2.5265 | 0.5860_T3 | 1.544_n3 | 56.114_v3 | 1.414_f3 | plastic |
| 932 | | -1.0206 | 0.1230_G34 | | | | |
| 941 | 4th lens element | -11.7386 | 0.1990_T4 | 1.640_n4 | 23.529_v4 | -2.376_f4 | plastic |
| 942 | | 1.7727 | 0.0920_G45 | | | | |
| 951 | 5th lens element | 3.2427 | 0.3190_T5 | 1.535_n5 | 55.712_v5 | 13.242_f5 | plastic |
| 952 | | 5.7580 | 0.0970_G56 | | | | |
| 961 | 6th lens element | 5.4150 | 0.5430_T6 | 1.531_n6 | 55.744_v6 | -10.320_f6 | plastic |
| 962 | | 2.6334 | 0.2000_G6F | | | | |
| 971 | IR cut filter | ∞ | 0.2100_TF | 1.517 | 64.167 | | |
| 972 | | ∞ | 0.4020_GFP | | | | |
| 980 | Image plane | ∞ | | | | | |

FIG. 36

| Aspherical parameters | | | | | | |
|---|---|---|---|---|---|---|
| Surface # | 912 | 921 | 922 | 931 | 932 | 941 |
| K | 0.0000E+00 | 0.0000E+00 | 0.0000E+00 | 0.0000E+00 | 0.0000E+00 | 0.0000E+00 |
| $a_4$ | 1.9834E-01 | 1.3534E-01 | -6.3664E-02 | -1.3958E-01 | 2.6396E-01 | -5.3032E-02 |
| $a_6$ | 1.5012E-02 | -7.7933E-01 | -6.7095E-01 | 3.4169E-01 | -5.4403E-01 | -1.2887E+00 |
| $a_8$ | -2.5071E-02 | 7.3546E-01 | 2.1575E+00 | -8.7066E-01 | -1.6936E-01 | 1.5599E+00 |
| $a_{10}$ | 0.0000E+00 | 0.0000E+00 | 0.0000E+00 | 2.4536E+00 | 1.2914E+00 | -2.4778E-01 |
| $a_{12}$ | 0.0000E+00 | 0.0000E+00 | 0.0000E+00 | 0.0000E+00 | 2.7827E+00 | -2.5041E-02 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 942 | 951 | 952 | 961 | 962 | |
| K | 0.0000E+00 | 0.0000E+00 | 0.0000E+00 | 0.0000E+00 | 0.0000E+00 | |
| $a_4$ | -2.1159E-01 | -2.6076E-02 | 2.5787E-02 | -8.7603E-02 | -1.7259E-01 | |
| $a_6$ | -1.6341E-01 | 5.2169E-02 | -6.5723E-02 | 2.1960E-02 | -1.5274E-02 | |
| $a_8$ | 3.1893E-01 | -1.0040E-01 | 1.6078E-02 | 9.5719E-03 | 1.0092E-02 | |
| $a_{10}$ | -2.3979E-01 | 0.0000E+00 | 0.0000E+00 | 1.6538E-03 | 2.4622E-03 | |
| $a_{12}$ | 0.0000E+00 | 0.0000E+00 | 0.0000E+00 | -4.1517E-04 | 6.4893E-04 | |
| $a_{14}$ | 0.0000E+00 | 0.0000E+00 | 0.0000E+00 | -1.3629E-03 | 6.6194E-05 | |
| $a_{16}$ | 0.0000E+00 | 0.0000E+00 | 0.0000E+00 | -4.7835E-04 | -5.0162E-05 | |

FIG. 37

| f(Focus)= 2.057mm, HFOV(Half angular field of view)= 70.00deg., Fno= 2.4, System length= 3.812mm |||||||
|---|---|---|---|---|---|---|---|
| Surface # | | Radius | Thickness | Refractive index | Abbe number | Focus | Material |
| - | Object | ∞ | ∞ | | | | |
| 1011 | 1st lens element | 38.6073 | 0.2830_T1 | 1.640_n1 | 23.529_v1 | -33.268_f1 | plastic |
| 1012 | | 13.7470 | 0.2910_G12 | | | | |
| 1021 | 2nd lens element | -4.4400 | 0.4710_T2 | 1.535_n2 | 55.712_v2 | 17.249_f2 | plastic |
| 1022 | | -3.1122 | 0.0850_G23-TA | | | | |
| 1000 | Aperture stop | ∞ | -0.0190_TA | | | | |
| 1031 | 3rd lens element | 2.4217 | 0.5770_T3 | 1.544_n3 | 56.114_v3 | 1.387_f3 | plastic |
| 1032 | | -1.0085 | 0.1320_G34 | | | | |
| 1041 | 4th lens element | -9.6294 | 0.2680_T4 | 1.640_n4 | 23.529_v4 | -2.329_f4 | plastic |
| 1042 | | 1.7980 | 0.1060_G45 | | | | |
| 1051 | 5th lens element | 4.2183 | 0.2980_T5 | 1.535_n5 | 55.712_v5 | 11.656_f5 | plastic |
| 1052 | | 12.6265 | 0.2000_G56 | | | | |
| 1061 | 6th lens element | 5.9376 | 0.3450_T6 | 1.531_n6 | 55.744_v6 | -6.967_f6 | plastic |
| 1062 | | 2.2380 | 0.2000_G6F | | | | |
| 1071 | IR cut filter | ∞ | 0.2100_TF | 1.517 | 64.167 | | |
| 1072 | | ∞ | 0.3650_GFP | | | | |
| 1080 | Image plane | ∞ | | | | | |

FIG. 40

| Aspherical parameters | | | | | | |
|---|---|---|---|---|---|---|
| Surface # | 1012 | 1021 | 1022 | 1031 | 1032 | 1041 |
| K | 0.0000E+00 | 0.0000E+00 | 0.0000E+00 | 0.0000E+00 | 0.0000E+00 | 0.0000E+00 |
| $a_4$ | 1.9442E-01 | 1.2132E-01 | -5.1231E-02 | -1.1294E-01 | 2.6973E-01 | -7.0932E-02 |
| $a_6$ | 1.6266E-02 | -7.9390E-01 | -6.2498E-01 | 3.1378E-01 | -5.6500E-01 | -1.3259E+00 |
| $a_8$ | -8.2895E-03 | 7.1844E-01 | 2.1036E+00 | -1.0380E+00 | -2.5787E-01 | 1.5813E+00 |
| $a_{10}$ | 0.0000E+00 | 0.0000E+00 | 0.0000E+00 | 2.5096E+00 | 1.1441E+00 | -2.6217E-01 |
| $a_{12}$ | 0.0000E+00 | 0.0000E+00 | 0.0000E+00 | 0.0000E+00 | 2.8254E+00 | -2.3303E-01 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 1042 | 1051 | 1052 | 1061 | 1062 | |
| K | 0.0000E+00 | 0.0000E+00 | 0.0000E+00 | 0.0000E+00 | 0.0000E+00 | |
| $a_4$ | -2.0383E-01 | -2.9409E-02 | 1.8350E-02 | -8.9287E-02 | -2.0623E-01 | |
| $a_6$ | -1.6212E-01 | 5.3854E-02 | -6.6869E-02 | 1.9128E-02 | -1.1028E-02 | |
| $a_8$ | 3.1875E-01 | -9.8875E-02 | 1.5279E-02 | 9.1481E-03 | 1.1846E-02 | |
| $a_{10}$ | -2.3798E-01 | 0.0000E+00 | 0.0000E+00 | 1.8668E-03 | 3.1334E-03 | |
| $a_{12}$ | 0.0000E+00 | 0.0000E+00 | 0.0000E+00 | -1.9908E-04 | 7.6684E-04 | |
| $a_{14}$ | 0.0000E+00 | 0.0000E+00 | 0.0000E+00 | -1.1636E-03 | 6.2833E-05 | |
| $a_{16}$ | 0.0000E+00 | 0.0000E+00 | 0.0000E+00 | -3.5729E-04 | -3.8051E-05 | |

FIG. 41

| f(Focus)= 1.390mm, HFOV(Half angular field of view)= 60.00deg., Fno= 2.4, System length= 3.852mm ||||||||
|---|---|---|---|---|---|---|---|
| Surface # | | Radius | Thickness | Refractive index | Abbe number | Focus | Material |
| - | Object | ∞ | ∞ | | | | |
| 1111 | 1st lens element | 4.6398 | 0.2620_T1 | 1.640_n1 | 23.529_v1 | -1.892_f1 | plastic |
| 1112 | | 0.9442 | 0.2960_G12 | | | | |
| 1121 | 2nd lens element | 2.2522 | 0.6360_T2 | 1.535_n2 | 55.712_v2 | 5.172_f2 | plastic |
| 1122 | | 10.7539 | 0.0500_G23-TA | | | | |
| 1100 | Aperture stop | ∞ | 0.0110_TA | | | | |
| 1131 | 3rd lens element | 2.4177 | 0.4670_T3 | 1.544_n3 | 56.114_v3 | 0.981_f3 | plastic |
| 1132 | | -0.6409 | 0.0500_G34 | | | | |
| 1141 | 4th lens element | 3.4960 | 0.2540_T4 | 1.640_n4 | 23.529_v4 | -1.894_f4 | plastic |
| 1142 | | 0.8792 | 0.0640_G45 | | | | |
| 1151 | 5th lens element | 1.2373 | 0.2410_T5 | 1.535_n5 | 55.712_v5 | -20.511_f5 | plastic |
| 1152 | | 1.0366 | 0.1220_G56 | | | | |
| 1161 | 6th lens element | 1.7673 | 0.5330_T6 | 1.531_n6 | 55.744_v6 | 4.049_f6 | plastic |
| 1162 | | 8.7507 | 0.2000_G6F | | | | |
| 1171 | IR cut filter | ∞ | 0.2100_TF | 1.517 | 64.167 | | |
| 1172 | | ∞ | 0.4560_GFP | | | | |
| 1180 | Image plane | ∞ | | | | | |

FIG. 44

| Aspherical parameters | | | | | | |
|---|---|---|---|---|---|---|
| Surface # | 1112 | 1121 | 1122 | 1131 | 1132 | 1141 |
| K | 0.0000E+00 | 0.0000E+00 | 0.0000E+00 | 0.0000E+00 | 0.0000E+00 | 0.0000E+00 |
| $a_4$ | -1.9016E-01 | -6.3294E-01 | -1.5435E+00 | -1.5715E+00 | 1.6126E+00 | 1.2771E-01 |
| $a_6$ | 1.1458E-01 | -2.4240E+00 | 2.3391E+00 | 6.7255E+00 | -1.0587E+01 | -5.0578E+00 |
| $a_8$ | -1.2241E+00 | 4.2568E+00 | 9.5563E+00 | -2.9454E+01 | 4.6717E+01 | 1.4274E+01 |
| $a_{10}$ | 0.0000E+00 | 0.0000E+00 | 0.0000E+00 | 6.7291E+01 | -1.1232E+02 | -1.8259E+01 |
| $a_{12}$ | 0.0000E+00 | 0.0000E+00 | 0.0000E+00 | 0.0000E+00 | 1.1125E+02 | -1.4660E+01 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 1142 | 1151 | 1152 | 1161 | 1162 | |
| K | 0.0000E+00 | 0.0000E+00 | 0.0000E+00 | 0.0000E+00 | 0.0000E+00 | |
| $a_4$ | -7.0702E-01 | 2.4697E-02 | -3.8697E-01 | -4.5137E-01 | -9.1530E-02 | |
| $a_6$ | -1.9490E-01 | -1.0405E+00 | 3.2636E-03 | 7.3322E-01 | -2.1240E-01 | |
| $a_8$ | 3.3110E-01 | 7.7940E-01 | -1.5000E-01 | -3.8471E-01 | 3.9557E-01 | |
| $a_{10}$ | -6.9894E-01 | 0.0000E+00 | 0.0000E+00 | -1.4934E-01 | -3.8410E-01 | |
| $a_{12}$ | 0.0000E+00 | 0.0000E+00 | 0.0000E+00 | -7.4277E-03 | 3.2496E-01 | |
| $a_{14}$ | 0.0000E+00 | 0.0000E+00 | 0.0000E+00 | 2.7149E-01 | -1.3169E-01 | |
| $a_{16}$ | 0.0000E+00 | 0.0000E+00 | 0.0000E+00 | -1.3198E-01 | 7.3064E-03 | |

FIG. 45

| f(Focus)= 1.278mm, HFOV(Half angular field of view)= 60.00deg., Fno= 2.4, System length= 3.341mm ||||||||
|---|---|---|---|---|---|---|---|
| Surface # | | Radius | Thickness | Refractive index | Abbe number | Focus | Material |
| - | Object | ∞ | ∞ | | | | |
| 1211 | 1st lens element | 1.5184 | 0.2400_T1 | 1.640_n1 | 23.529_v1 | -4.407_f1 | plastic |
| 1212 | | 0.9282 | 0.4500_G12 | | | | |
| 1221 | 2nd lens element | -0.7311 | 0.2200_T2 | 1.535_n2 | 55.712_v2 | -312.965_f2 | plastic |
| 1222 | | -0.8114 | 0.1000_G23-TA | | | | |
| 1200 | Aperture stop | ∞ | -0.0210_TA | | | | |
| 1231 | 3rd lens element | 1.6896 | 0.3900_T3 | 1.544_n3 | 56.114_v3 | 0.996_f3 | plastic |
| 1232 | | -0.7367 | 0.0820_G34 | | | | |
| 1241 | 4th lens element | -3.9691 | 0.2000_T4 | 1.640_n4 | 23.529_v4 | -1.311_f4 | plastic |
| 1242 | | 1.0946 | 0.0900_G45 | | | | |
| 1251 | 5th lens element | 2.6346 | 0.2400_T5 | 1.535_n5 | 55.712_v5 | 11.602_f5 | plastic |
| 1252 | | 4.4208 | 0.0500_G56 | | | | |
| 1261 | 6th lens element | 1.1792 | 0.4000_T6 | 1.531_n6 | 55.744_v6 | 2.070_f6 | plastic |
| 1262 | | -15.0732 | 0.2000_G6F | | | | |
| 1271 | IR cut filter | ∞ | 0.2100_TF | 1.517 | 64.167 | | |
| 1272 | | ∞ | 0.4900_GFP | | | | |
| 1280 | Image plane | ∞ | | | | | |

FIG. 48

| Aspherical parameters | | | | | | |
|---|---|---|---|---|---|---|
| Surface # | 1212 | 1221 | 1222 | 1231 | 1232 | 1241 |
| K | 0.0000E+00 | 0.0000E+00 | 0.0000E+00 | 0.0000E+00 | 0.0000E+00 | 0.0000E+00 |
| $a_4$ | 2.1118E-01 | 3.2892E-01 | 7.9289E-01 | 4.1009E-01 | 9.1630E-01 | -2.8057E-01 |
| $a_6$ | -1.8125E-01 | 6.5621E-01 | -1.2087E+00 | -2.2530E+00 | -1.8600E+00 | -1.8410E+00 |
| $a_8$ | 2.2049E+00 | 1.3268E+00 | 8.8242E+00 | 1.3853E+01 | 8.0418E+00 | 4.7458E+00 |
| $a_{10}$ | 0.0000E+00 | 0.0000E+00 | 0.0000E+00 | -1.9847E+01 | -4.1539E+01 | -1.1331E+01 |
| $a_{12}$ | 0.0000E+00 | 0.0000E+00 | 0.0000E+00 | 0.0000E+00 | 1.7466E+02 | 1.1152E+01 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 1242 | 1251 | 1252 | 1261 | 1262 | |
| K | 0.0000E+00 | 0.0000E+00 | 0.0000E+00 | 0.0000E+00 | 2.6859E+02 | |
| $a_4$ | -9.5782E-01 | 7.6666E-01 | 3.0312E-02 | -4.4156E-01 | 2.2098E-01 | |
| $a_6$ | -2.0929E-02 | -2.2422E+00 | 3.2931E-01 | 4.1165E-01 | -3.2153E-01 | |
| $a_8$ | -2.6539E+00 | 1.2591E-01 | -4.0329E-01 | -2.0526E-01 | 8.2239E-01 | |
| $a_{10}$ | 2.2199E+00 | 0.0000E+00 | 0.0000E+00 | -3.9897E-02 | -1.0817E+00 | |
| $a_{12}$ | 0.0000E+00 | 0.0000E+00 | 0.0000E+00 | 4.2494E-01 | 5.0539E-01 | |
| $a_{14}$ | 0.0000E+00 | 0.0000E+00 | 0.0000E+00 | -4.9753E-01 | 1.1341E-01 | |
| $a_{16}$ | 0.0000E+00 | 0.0000E+00 | 0.0000E+00 | -1.2644E-01 | -1.7444E-01 | |

FIG. 49

| Embodiment | 1st | 2nd | 3rd | 4th | 5th | 6th | 7th | 8th | 9th | 10th | 11th | 12th |
|---|---|---|---|---|---|---|---|---|---|---|---|---|
| T1 | 0.251 | 0.299 | 0.251 | 0.25 | 0.253 | 1.051 | 0.3 | 0.297 | 0.825 | 0.283 | 0.262 | 0.24 |
| G12 | 0.661 | 0.231 | 0.209 | 0.13 | 0.41 | 0.159 | 0.249 | 0.286 | 0.262 | 0.291 | 0.296 | 0.45 |
| T2 | 0.257 | 0.254 | 0.25 | 0.499 | 0.251 | 0.494 | 0.529 | 0.422 | 0.416 | 0.471 | 0.636 | 0.22 |
| G23 | 0.128 | 0.197 | 0.193 | 0.102 | 0.038 | 0.16 | 0.031 | 0.089 | 0.077 | 0.066 | 0.061 | 0.079 |
| T3 | 0.493 | 0.503 | 0.507 | 0.491 | 0.503 | 0.498 | 0.616 | 0.574 | 0.586 | 0.577 | 0.467 | 0.39 |
| G34 | 0.132 | 0.038 | 0.061 | 0.093 | 0.058 | 0.063 | 0.125 | 0.122 | 0.123 | 0.132 | 0.05 | 0.082 |
| T4 | 0.261 | 0.344 | 0.295 | 0.254 | 0.375 | 0.28 | 0.27 | 0.294 | 0.199 | 0.268 | 0.254 | 0.2 |
| G45 | 0.118 | 0.094 | 0.096 | 0.06 | 0.082 | 0.13 | 0.093 | 0.1 | 0.092 | 0.106 | 0.064 | 0.09 |
| T5 | 0.279 | 0.539 | 0.548 | 0.311 | 0.535 | 0.354 | 0.718 | 0.223 | 0.319 | 0.298 | 0.241 | 0.24 |
| G56 | 0.316 | 0.056 | 0.055 | 0.1 | 0.05 | 0.006 | 0.055 | 0.142 | 0.097 | 0.2 | 0.122 | 0.05 |
| T6 | 0.329 | 0.507 | 0.508 | 1.009 | 0.374 | 0.355 | 0.347 | 0.566 | 0.543 | 0.345 | 0.533 | 0.4 |
| G6R | 0.2 | 0.2 | 0.2 | 0.2 | 0.2 | 0.2 | 0.2 | 0.2 | 0.2 | 0.2 | 0.2 | 0.2 |
| TF | 0.21 | 0.21 | 0.21 | 0.21 | 0.21 | 0.21 | 0.21 | 0.21 | 0.21 | 0.21 | 0.21 | 0.21 |
| GFP | 0.41 | 0.394 | 0.429 | 0.226 | 0.3 | 0.595 | 0.387 | 0.417 | 0.402 | 0.365 | 0.456 | 0.49 |
| AAG | 1.355 | 0.616 | 0.614 | 0.485 | 0.638 | 0.518 | 0.553 | 0.739 | 0.651 | 0.795 | 0.593 | 0.751 |
| ALT | 1.87 | 2.446 | 2.359 | 2.814 | 2.291 | 3.032 | 2.78 | 2.376 | 2.888 | 2.242 | 2.393 | 1.69 |
| BFL | 0.82 | 0.804 | 0.839 | 0.636 | 0.71 | 1.005 | 0.797 | 0.827 | 0.812 | 0.775 | 0.866 | 0.9 |
| EFL | 2.228 | 2.106 | 2.147 | 2.11 | 1.913 | 2.043 | 2.233 | 2.205 | 2.087 | 2.057 | 1.39 | 1.278 |
| TTL | 4.045 | 3.866 | 3.812 | 3.935 | 3.639 | 4.555 | 4.13 | 3.942 | 4.351 | 3.812 | 3.852 | 3.341 |
| AAG/T1 | 5.398 | 2.060 | 2.446 | 1.940 | 2.522 | 0.493 | 1.843 | 2.488 | 0.789 | 2.809 | 2.263 | 3.129 |
| T6/(G34+G56) | 0.734 | 5.394 | 4.379 | 5.228 | 3.463 | 5.145 | 1.928 | 2.144 | 2.468 | 1.039 | 3.099 | 3.030 |
| AAG/T3 | 2.748 | 1.225 | 1.211 | 0.988 | 1.268 | 1.040 | 0.898 | 1.287 | 1.111 | 1.378 | 1.270 | 1.926 |
| T5/(G34+G56) | 0.623 | 5.734 | 4.724 | 1.611 | 4.954 | 5.130 | 3.989 | 0.845 | 1.450 | 0.898 | 1.401 | 1.818 |
| ALT/AAG | 1.380 | 3.971 | 3.842 | 5.802 | 3.591 | 5.853 | 5.027 | 3.215 | 4.436 | 2.820 | 4.035 | 2.250 |
| T3/(G34+G56) | 1.100 | 5.351 | 4.371 | 2.544 | 4.657 | 7.217 | 3.422 | 2.174 | 2.664 | 1.738 | 2.715 | 2.955 |
| T2/T4 | 0.985 | 0.738 | 0.847 | 1.965 | 0.669 | 1.764 | 1.959 | 1.435 | 2.090 | 1.757 | 2.504 | 1.100 |
| T2/G12 | 0.389 | 1.100 | 1.196 | 3.838 | 0.612 | 3.107 | 2.124 | 1.476 | 1.588 | 1.619 | 2.149 | 0.489 |
| (G23+G45)/T1 | 0.980 | 0.973 | 1.151 | 0.648 | 0.474 | 0.276 | 0.413 | 0.636 | 0.205 | 0.608 | 0.477 | 0.704 |
| T2/AAG | 0.190 | 0.412 | 0.407 | 1.029 | 0.393 | 0.954 | 0.957 | 0.571 | 0.639 | 0.592 | 1.073 | 0.293 |
| ALT/(G34+G56) | 4.174 | 26.021 | 20.336 | 14.580 | 21.213 | 43.942 | 15.444 | 9.000 | 13.127 | 6.753 | 13.913 | 12.803 |
| AAG/T5 | 4.857 | 1.143 | 1.120 | 1.559 | 1.193 | 1.463 | 0.770 | 3.314 | 2.041 | 2.668 | 2.461 | 3.129 |
| G12/T1 | 2.633 | 0.773 | 0.833 | 0.520 | 1.621 | 0.151 | 0.830 | 0.963 | 0.318 | 1.028 | 1.130 | 1.875 |
| T6/T4 | 1.261 | 1.474 | 1.722 | 3.972 | 0.997 | 1.268 | 1.285 | 1.925 | 2.729 | 1.287 | 2.098 | 2.000 |
| T1/T4 | 0.962 | 0.869 | 0.851 | 0.984 | 0.675 | 3.754 | 1.111 | 1.010 | 4.146 | 1.056 | 1.031 | 1.200 |
| T6/G12 | 0.498 | 2.195 | 2.431 | 7.762 | 0.912 | 2.233 | 1.394 | 1.979 | 2.073 | 1.186 | 1.801 | 0.889 |
| T5/T4 | 1.069 | 1.567 | 1.858 | 1.224 | 1.427 | 1.264 | 2.659 | 0.759 | 1.603 | 1.112 | 0.949 | 1.200 |
| T5/G12 | 0.422 | 2.333 | 2.622 | 2.392 | 1.305 | 2.226 | 2.884 | 0.780 | 1.218 | 1.024 | 0.814 | 0.533 |

MOBILE DEVICE AND OPTICAL IMAGING LENS THEREOF

INCORPORATION BY REFERENCE

This application claims priority from R.O.C. Patent Application No. 201410234792.9, filed on May 29, 2014, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having six lens elements and an optical imaging lens thereof.

BACKGROUND

The ever-increasing demand for smaller sized mobile devices, such as cell phones, digital cameras, etc. correspondingly triggered a growing need for a smaller sized photography module, comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

The length of conventional optical imaging lenses comprising four lens elements can be limited in a certain range; however, as the more and more demands in the market for high-end products, high-standard optical imaging lenses which show great quality with more pixels are required.

U.S. Pat. Nos. 7,663,814 and 8,040,618 disclosed optical imaging lens constructed with an optical imaging lens having six lens elements. However, the length of the optical imaging lens, which, from the object-side surface of the first lens element to the image plane, is over 21 mm that is too long for smaller sized mobile devices.

Therefore, there is needed to develop optical imaging lens which is capable to place with six lens elements therein, with a shorter length, while also having good optical characteristics.

SUMMARY

An object of the present invention is to provide a camera device and an optical imaging lens thereof. With controlling the convex or concave shape of the surfaces and designing parameters satisfying at least one inequality, the length of the optical imaging lens is shortened and meanwhile the good optical characteristics, and system functionality are sustained.

In an exemplary embodiment, an optical imaging lens comprises, sequentially from an object side to an image side along an optical axis, a first lens element, a second lens element, an aperture stop, a third lens element, a fourth lens element, a fifth lens element and a sixth lens element, each of the first, second, third, fourth, fifth and sixth lens elements having refractive power, an object-side surface facing toward the object side and an image-side surface facing toward the image side and a central thickness defined along the optical axis.

In the specification, parameters used here are: the central thickness of the first lens element, represented by T1, an air gap between the first lens element and the second lens element along the optical axis, represented by G12, the central thickness of the second lens element, represented by T2, an air gap between the second lens element and the third lens element along the optical axis, represented by G23, the central thickness of the third lens element, represented by T3, an air gap between the third lens element and the fourth lens element along the optical axis, represented by G34, the central thickness of the fourth lens element, represented by T4, an air gap between the fourth lens element and the fifth lens element along the optical axis, represented by G45, the central thickness of the fifth lens element, represented by T5, an air gap between the fifth lens element and the sixth lens element along the optical axis, represented by G56, the central thickness of the sixth lens element, represented by T6, a distance between the image-side surface of the sixth lens element and the object-side surface of a filtering unit along the optical axis, represented by G6F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, a focusing length of the sixth lens element, represented by f6, the refractive index of the first lens element, represented by n1, the refractive index of the second lens element, represented by n2, the refractive index of the third lens element, represented by n3, the refractive index of the fourth lens element, represented by n4, the refractive index of the fifth lens element, represented by n5, the refractive index of the sixth lens element, represented by n6, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an abbe number of the sixth lens element, represented by v6, an effective focal length of the optical imaging lens, represented by EFL, the length between the object-side surface of the first lens element and the image plane along the optical axis, represented by TTL, a sum of the central thicknesses of all six lens elements, comprising T1, T2, T3 T4, T5 and T6, represented by ALT, a sum of all five air gaps from the first lens element to the sixth lens element along the optical axis, represented by AAG, and a back focal length of the optical imaging lens, which is defined as the distance from the image-side surface of the sixth lens element to the image plane along the optical axis comprising G6F, TF and GFP and represented by BFL, the distance between an aperture stop and the next lens element (which is the fourth lens element in the present invention) in the direction to the imaging plane, represented by TA.

In an exemplary embodiment, the object-side surface of the first lens element comprises a convex portion in a vicinity of a periphery of the first lens element; the image-side surface of the first lens element comprises a concave portion in a vicinity of the optical axis; the second lens element made of plastic; the object-side surface of the third lens element comprises a convex portion in a vicinity of the optical axis; the image-side surface of the fourth lens element comprises a convex portion in a vicinity of a periphery of the fourth lens element; the object-side surface of the fifth lens element comprises a convex portion in a vicinity of the optical axis; the image-side surface of the sixth lens element comprises a convex portion in a vicinity of a periphery of the sixth lens element and the six lens element is made of plastic; and the optical imaging lens comprises no other lenses having refracting power beyond the six lens elements, and T1 and AAG satisfy the equation:

$$AAG/T1 \leq 15 \qquad \text{Equation (1).}$$

In another exemplary embodiment, other equation(s), such as those relating to the ratio among parameters could be taken into consideration. For example, T6, G34 and G56 could be controlled to satisfy the equation as follows:

$$T6/(G34+G56) \leq 20 \qquad \text{Equation (2); or}$$

T3 and AAG could be controlled to satisfy the equation as follows:

$$AAG/T3 \leq 2.8 \qquad \text{Equation (3); or}$$

T5, G34 and G56 could be controlled to satisfy the equation as follows:

$$T5/(G34+G56) \leq 5.75 \qquad \text{Equation (4); or}$$

ALT and AAG could be controlled to satisfy the equation as follows:

$$2.2 \leq ALT/AAG \qquad \text{Equation (5); or}$$

T3, G34 and G56 could be controlled to satisfy the equation as follows:

$$T3/(G34+G56) \leq 12 \qquad \text{Equation (6); or}$$

T2 and T4 could be controlled to satisfy the equation as follows:

$$0.66 \leq T2/T4 \qquad \text{Equation (7); or}$$

T2 and G12 could be controlled to satisfy the equation as follows:

$$T2/G12 \leq 1.75 \qquad \text{Equation (8); or}$$

$$0.35 \leq T2/G12 \leq 1.75 \qquad \text{Equation (8'); or}$$

T1, G23 and G45 could be controlled to satisfy the equation as follows:

$$0.27 \leq (G23+G45)/T1 \leq 2 \qquad \text{Equation (9); or}$$

T2 and AAG could be controlled to satisfy the equation as follows:

$$T2/AAG \leq 1.1 \qquad \text{Equation (10); or}$$

ALT, G34 and G56 could be controlled to satisfy the equation as follows:

$$6.5 \leq ALT/(G34+G56) \qquad \text{Equation (11); or}$$

T5, and AAG could be controlled to satisfy the equation as follows:

$$AAG/T5 \leq 8 \qquad \text{Equation (12); or}$$

T1 and G12 could be controlled to satisfy the equation as follows:

$$G12/T1 \leq 1.88 \qquad \text{Equation (13); or}$$

T4 and T6 could be controlled to satisfy the equation as follows:

$$1.25 \leq T6/T4 \qquad \text{Equation (14); or}$$

T1 and T4 could be controlled to satisfy the equation as follows:

$$0.67 \leq T1/T4 \qquad \text{Equation (15); or}$$

T6 and G12 could be controlled to satisfy the equation as follows:

$$1 \leq T6/G12 \qquad \text{Equation (16);}$$

T4 and T5 could be controlled to satisfy the equation as follows:

$$0.6 \leq T5/T4 \qquad \text{Equation (17);}$$

G12 and T5 could be controlled to satisfy the equation as follows:

$$0.5 \leq T5/G12 \qquad \text{Equation (18).}$$

Aforesaid exemplary embodiments are not limited and could be selectively incorporated in other embodiments described herein.

In some exemplary embodiments, more details about the convex or concave surface structure, refractive power could be incorporated for one specific lens element or broadly for plural lens elements to enhance the control for the system performance and/or resolution. It is noted that the details listed here could be incorporated in example embodiments if no inconsistency occurs.

In another exemplary embodiment, a mobile device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, and the image sensor is positioned at the image side of the optical imaging lens.

Through controlling the convex or concave shape of the surfaces and/or the refraction power of the lens element(s), the camera device and the optical imaging lens thereof in exemplary embodiments achieve good optical characters and effectively reduce the length of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 28 is a table of optical data for each lens element of the optical imaging lens of a seventh embodiment of the present disclosure;

FIG. 29 is a table of aspherical data of a seventh embodiment of the optical imaging lens according to the present disclosure;

FIG. 32 is a table of optical data for each lens element of the optical imaging lens of an eighth embodiment of the present disclosure;

FIG. 33 is a table of aspherical data of an eighth embodiment of the optical imaging lens according to the present disclosure;

FIG. 36 is a table of optical data for each lens element of the optical imaging lens of an ninth embodiment of the present disclosure;

FIG. 37 is a table of aspherical data of an ninth embodiment of the optical imaging lens according to the present disclosure;

FIG. 40 is a table of optical data for each lens element of the optical imaging lens of a tenth embodiment of the present disclosure;

FIG. 41 is a table of aspherical data of a tenth embodiment of the optical imaging lens according to the present disclosure;

FIG. 44 is a table of optical data for each lens element of the optical imaging lens of a eleventh embodiment of the present disclosure;

FIG. 45 is a table of aspherical data of a eleventh embodiment of the optical imaging lens according to the present disclosure;

FIG. 48 is a table of optical data for each lens element of the optical imaging lens of a twelfth embodiment of the present disclosure;

FIG. 49 is a table of aspherical data of a twelfth embodiment of the optical imaging lens according to the present disclosure;

FIG. 50 is a table for the values of T1, G12, T2, G23, T3, G34, T4, G45, T5, G56, T6, G6F, TF, GFP, EFL, AAG, ALT, BFL, TTL, EFL/T2, ALT/T4, AAG/T4, BFL/(G23+G34), BFL/T6, (G23+G34)/T4, AAG/(G23+G34), EFL/T5, T6/T4, BFL/T4, ALT/T6 and AAG/T6 of all twelve example embodiments;

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
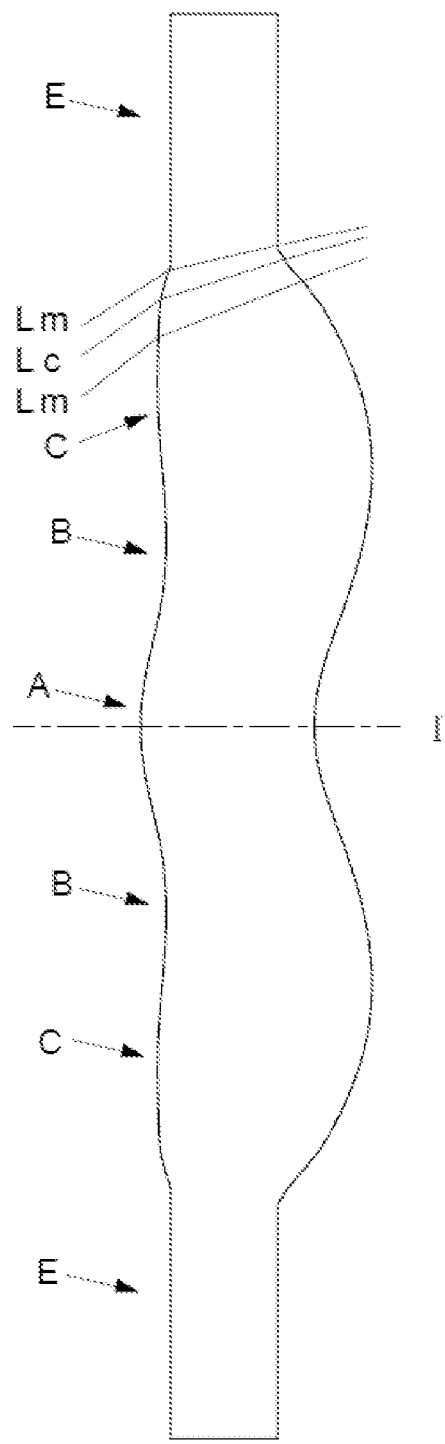
FIG. 1 is a cross-sectional view of one single lens element according to the present disclosure.

Here in the present specification, "a lens element having positive refractive power (or negative refractive power)" means that the lens element has positive refractive power (or negative refractive power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. Taking FIG. 1 for example, the lens element shown therein is radially symmetric around the optical axis which is labeled by I. The object-side surface of the lens element comprises a convex portion at region A, a concave portion at region B, and another convex portion at region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

In the present invention, examples of an optical imaging lens which is a prime lens are provided. Example embodiments of an optical imaging lens may comprise a first lens element, a second lens element, an aperture stop, a third lens element, a fourth lens element, a fifth lens element and a sixth lens element, each of the lens elements comprises refractive power, an object-side surface facing toward an object side and an image-side surface facing toward an image side. These lens elements may be arranged sequentially from the object side to the image side along an optical axis, and example embodiments of the lens as a whole may comprise only the six lens elements having refractive power. Through controlling the convex or concave shape of the surfaces and/or the refraction power of the lens element(s), the camera device and the optical imaging lens thereof in exemplary embodiments achieve good optical characters and effectively shorten the length of the optical imaging lens.

In an example embodiment: the object-side surface of the first lens element comprises a convex portion in a vicinity of a periphery of the first lens element, the image-side surface of the first lens element comprises a concave portion in a vicinity of the optical axis; the second lens element made of plastic; the object-side surface of the third lens element comprises a convex portion in a vicinity of the optical axis; the image-side surface of the fourth lens element comprises a convex portion in a vicinity of a periphery of the fourth lens element; the object-side surface of the fifth lens element comprises a convex portion in a vicinity of the optical axis; the image-side surface of the sixth lens element comprises a convex portion in a vicinity of a periphery of the sixth lens element; and the sixth lens element made of plastic. The optical imaging lens could be controlled to further satisfy the equation as follows:

$$AAG/T1 \leq 15 \qquad \text{Equation (1).}$$

Preferably, the lens elements are designed in light of the optical characteristics and the length of the optical imaging lens. For example, the object-side surface of the first lens element comprises a convex portion in a vicinity of the optical axis; the image-side surface of the first lens element comprises a concave portion in a vicinity of the optical axis; the object-side surface of the third lens element comprises a convex portion in a vicinity of the optical axis; the image-side surface of the fourth lens element comprises a convex portion in a vicinity of a periphery of the fourth lens element; the object-side surface of the fifth lens element comprises a convex portion in a vicinity of the optical axis; the image-side surface of the sixth lens element comprises a convex portion in a vicinity of a periphery of the sixth lens element; the aberration of the optical imaging lens could be adjusted to promote the imaging quality of the optical imaging lens. Additionally, the aperture stop positioned between the second lens element and the third lens element may improve the imaging quality of the optical imaging lens as well. Then, the second lens element and the sixth lens element made of plastic, the benefit of reduced production cost and weight is enhanced.

Further, when the object-side surface of the first lens element is formed with a convex portion in a vicinity of the optical axis, the image-side surface of the first lens element comprises a concave portion in a vicinity of a periphery of the first lens element axis; the object-side surface of the second lens element is formed with a concave portion in a vicinity of a periphery of the second lens element, the image-side surface of the second lens element is formed with a convex portion in a vicinity of a periphery of the second lens element, the image-side surface of the third lens element is formed with a convex portion in a vicinity of the optical axis, and a convex portion in a vicinity of a periphery of the third lens element; the object-side surface of the fourth lens element is formed with a concave portion in a vicinity of a periphery of the fourth lens element, the image-side surface of the fourth lens element is formed with a concave portion in a vicinity of the optical axis; and/or the object-side surface of the sixth lens element is formed with a convex portion in a vicinity of the optical axis. The imaging quality is improved as the length of the optical imaging lens is shortened. When all lens elements are made by plastic material, the benefit of reduced production difficulty, cost and weight is enhanced.

In another exemplary embodiment, some equation(s) of parameters, such as those relating to the ratio among parameters could be taken into consideration. For example, T6, G34 and G56 could be controlled to satisfy the equation as follows:

$$T6/(G34+G56) \leq 20 \qquad \text{Equation (2); or}$$

T3 and AAG could be controlled to satisfy the equation as follows:

$$AAG/T3 \leq 2.8 \qquad \text{Equation (3); or}$$

T5, G34 and G56 could be controlled to satisfy the equation as follows:

$$T5/(G34+G56) \leq 5.75 \qquad \text{Equation (4); or}$$

AAG and ALT could be controlled to satisfy the equation as follows:

$$2.2 \leq ALT/AAG \qquad \text{Equation (5); or}$$

T3, G34 and G56 could be controlled to satisfy the equation as follows:

$$T3/(G34+G56) \leq 12 \qquad \text{Equation (6); or}$$

T2 and T4 could be controlled to satisfy the equation as follows:

$$0.66 \leq T2/T4 \qquad \text{Equation (7); or}$$

T2 and G12 could be controlled to satisfy the equation as follows:

$$T2/G12 \leq 1.75 \qquad \text{Equation (8);}$$

$$0.35 \leq T2/G12 \leq 1.75 \qquad \text{Equation (8'); or}$$

T1, G23 and G45 could be controlled to satisfy the equation as follows:

$$0.27 \leq (G23+G45)/T1 \leq 2 \qquad \text{Equation (9); or}$$

T2 and AAG could be controlled to satisfy the equation as follows:

$$T2/AAG \leq 1.1 \qquad \text{Equation (10); or}$$

G34, G56 and ALT could be controlled to satisfy the equation as follows:

$$6.5 \leq ALT/(G34+G56) \qquad \text{Equation (11); or}$$

T5 and AAG could be controlled to satisfy the equation as follows:

$$AAG/T5 \leq 8 \qquad \text{Equation (12); or}$$

T1 and G12 could be controlled to satisfy the equation as follows:

$$G12/T1 \leq 1.88 \qquad \text{Equation (13); or}$$

T4 and T6 could be controlled to satisfy the equation as follows:

$$1.25 \leq T6/T4 \qquad \text{Equation (14); or}$$

T1 and T4 could be controlled to satisfy the equation as follows:

$$0.67 \leq T1/T4 \qquad \text{Equation (15); or}$$

T6 and G12 could be controlled to satisfy the equation as follows:

$$1 \leq T6/G12 \qquad \text{Equation (16); or}$$

T4 and T5 could be controlled to satisfy the equation as follows:

$$0.6 \leq T5/T4 \qquad \text{Equation (17); or}$$

T5 and G12 could be controlled to satisfy the equation as follows:

$$0.5 \leq T5/G12 \qquad \text{Equation (18).}$$

Aforesaid exemplary embodiments are not limited and could be selectively incorporated in other embodiments described herein.

The shapes in a vicinity of the optical axis and a periphery of a lens element are varied in light of the light path to meet the requirements of imaging quality and demanded length of the optical imaging lens. Therefore, the thicknesses in a vicinity of the optical axis and a periphery of a lens element are different, and this makes the light incident in a lens element the more far from the optical axis requires for a refraction angle with the more degrees to focus on the imaging plane. Moreover, the width of the air gap also affects imaging quality of the optical imaging lens. Therefore, when Equations (1), (3), (5), (7), (10), (12), (14), (15) and (17) are satisfied, the air gap and thicknesses of the optical lens element are well balanced.

Reference is now made to Equations (2), (4), (6), (9) and (11). The air gap will impact the production yield, and shorter of the air gap makes the lens system assembly harder. Therefore, when Equations (2), (4), (6), (9) and (11) are satisfied, the lens system assembly yielded can be improved and get better image quality as well as shorter optical lens length.

Reference is now made to Equations (8), (13), (16), and (18). Considering the object-side of the first lens element has a convex portion in a vicinity of the periphery to wider the image angle thereof, thus, it must have enough air gap between the first lens element and second lens element to let the incident light enter the second lens element in a proper height. Therefore, when Equations (8), (13), (16), and (18) are satisfied, the value of AG12 can be maintained to get better overall thickness of the optical lens, and preferably, it is suggested to be within 0.35~1.75, to further improve the image quality.

Perfectly, $0.1 \leq AAG/T1 \leq 15$, $0.3 \leq T6/(G34+G56) \leq 20$, $0.3 \leq AAG/T3 \leq 2.8$, $0.3 \leq T5/(G34+G56) \leq 5.75$, $2.2 \leq ALT/AAG \leq 6.5$, $0.5 \leq T3/(G34+G56) \leq 12$, $0.66T2/T4 \leq 3$, $0.05 \leq T2/G12 \leq 1.75$, $0.05 \leq T2/AAG \leq 1.1$, $6.5 \leq ALT/(G34+G56) \leq 50$, $0.3 \leq AAG/T5 \leq 8$, $0.05 \leq G12/T1 \leq 1.88$, $1.25 \leq T6/T4 \leq 4.5$, $0.67 \leq T1/T4 \leq 4.6$, $1 \leq T6/G12 \leq 8.5$, $0.6 \leq T5/T4 \leq 3$, $0.5 \leq T5/G12 \leq 3.2$, satisfying these equations listed above may benefit to shorten the length of the optical imaging lens and promote the imaging quality.

In light of the unpredictability in an optical system, in the present invention, satisfying these equations listed above may preferably shortening the length of the optical imaging lens, lowering the f-number, enlarging the shot angle, promoting the imaging quality and/or increasing the yield in the assembly process.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Several exemplary embodiments and associated optical data will now be provided for illustrating example embodiments of optical imaging lens with good optical characters and a broadened shot angle. Reference is now made to FIGS.

Figure 2:
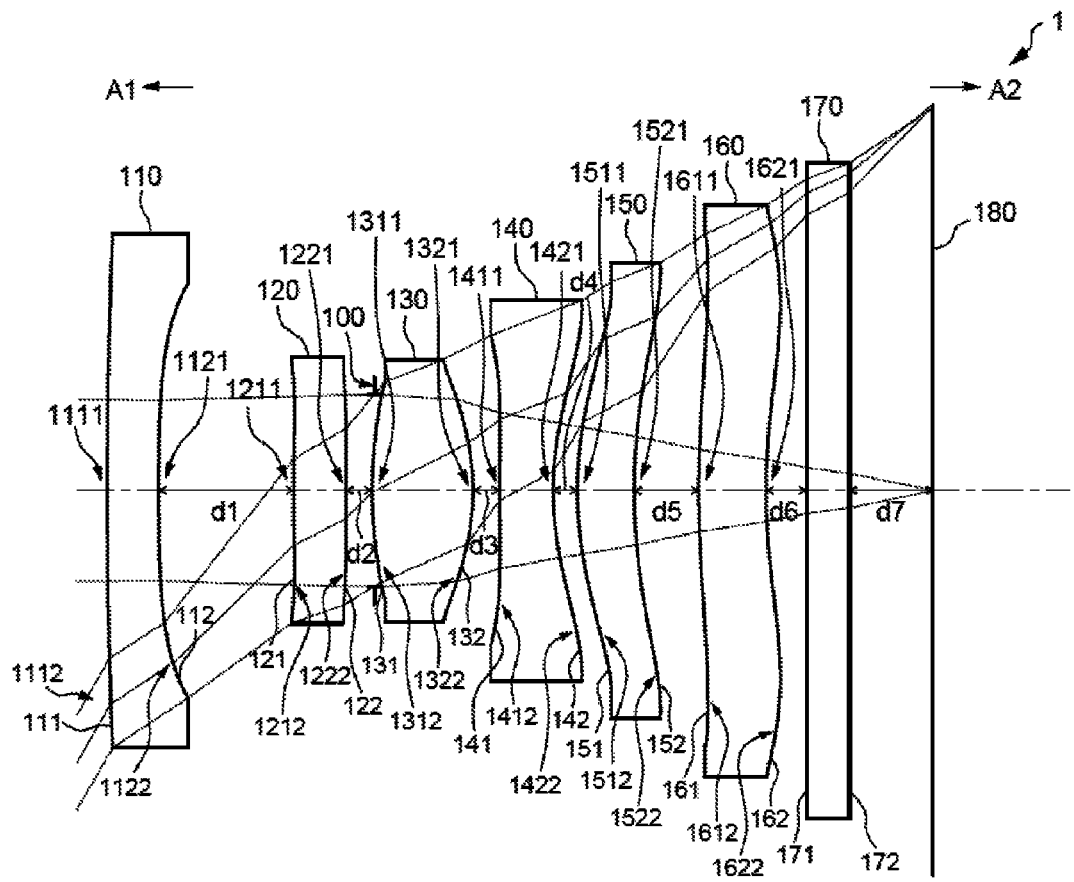
FIG. 2 is a cross-sectional view of a first embodiment of an optical imaging lens having six lens elements according to the present disclosure.
Figure 3:
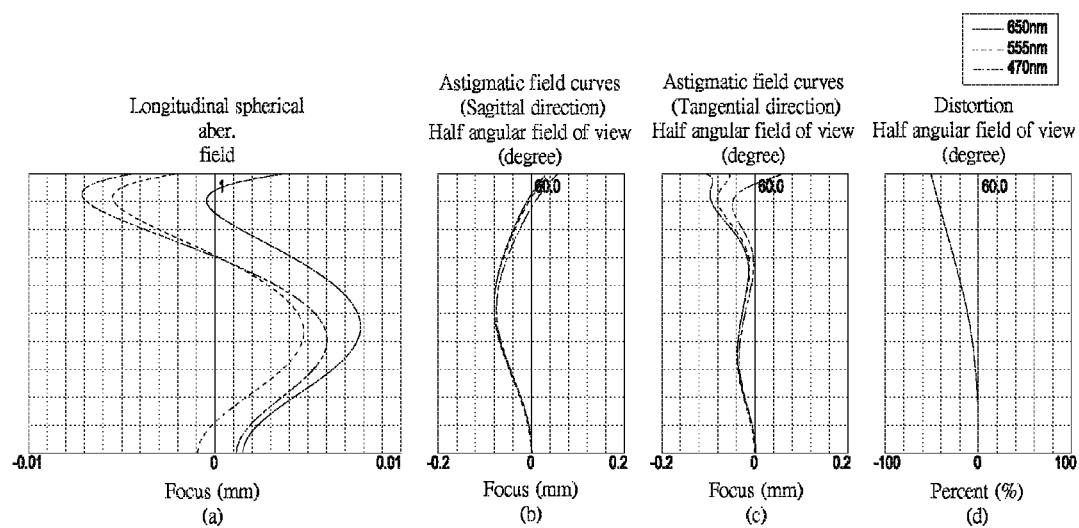
FIG. 3 is a chart of longitudinal spherical aberration and other kinds of optical aberrations of a first embodiment of the optical imaging lens according to the present disclosure.

2-5. FIG. 2 illustrates an example cross-sectional view of an optical imaging lens 1 having six lens elements of the optical imaging lens according to a first example embodiment. FIG. 3 shows example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment, in which a focal length of the optical imaging lens is labelled as "f". FIG. 5 depicts an example table of aspherical data of the optical imaging lens 1 according to an example embodiment.

As shown in FIG. 2, the optical imaging lens 1 of the present embodiment comprises, in order from an object side A1 to an image side A2 along an optical axis, a first lens element 110, a second lens element 120, an aperture stop 100, a third lens element 130, a fourth lens element 140, a fifth lens element 150 and a sixth lens element 160. A filtering unit 170 and an image plane 180 of an image sensor are positioned at the image side A2 of the optical lens 1. The filtering unit 170 selectively absorbs light with specific wavelength from the light passing optical imaging lens 1. For example, IR light is absorbed, and this will prohibit the IR light which is not seen by human eyes from producing an image on the image plane 180. Each of the first, second, third, fourth, fifth and sixth lens elements 110, 120, 130, 140, 150, 160 and the filtering unit 170 comprises an object-side surface 111/121/131/141/151/161/171 facing toward the object side A1 and an image-side surface 112/122/132/142/152/162/172 facing toward the image side A2. An image plane 170 of an image sensor is positioned at the image side A2 of the optical imaging lens 1.

Exemplary embodiments of the optical imaging lens 1, wherein the first, second, third, fourth, fifth and sixth lens elements 110, 120, 130, 140, 150, 160 which may be constructed by plastic material which can help reducing the weight of the image lens, will now be described with reference to the drawings.

An example embodiment of the first lens element 110 has negative refractive power, with an object-side surface 111 facing an object-side A1 and an image-side surface 112 facing an image-side A2. The object-side surface 111 is a convex surface comprising a convex portion 1111 in a vicinity of the optical axis and a convex portion 1112 in a vicinity of a periphery of the first lens element 110. The image-side surface 112 is a concave surface comprising a concave portion 1121 in a vicinity of the optical axis and a concave portion 1122 in a vicinity of the periphery of the first lens element 110.

An example embodiment of the second lens element 120 has positive refractive power. The object-side surface 121 comprises a convex portion 1211 in a vicinity of the optical axis and a concave portion 1212 in a vicinity of a periphery of the second lens element 120. The image-side surface 122 comprises a concave portion 1221 in a vicinity of the optical axis and a convex portion 1222 in a vicinity of the periphery of the second lens element 120.

An example embodiment of the third lens element 130 has positive refractive power. The object-side surface 131 is a convex surface comprises a convex portion 1311 in a vicinity of the optical axis and a convex portion 1312 in a vicinity of a periphery of the third lens element 130. The image-side surface 132 is a convex surface comprising a convex portion 1321 in a vicinity of the optical axis and a convex portion 1322 in a vicinity of the periphery of the third lens element 130.

An example embodiment of the fourth lens element 140 has negative refractive power. The object-side surface 141 is a concave surface comprising a concave portion 1411 in a vicinity of the optical axis and a concave portion 1412 in a vicinity of a periphery of the fourth lens element 140. The image-side surface 142 comprises a concave portion 1421 in a vicinity of the optical axis and a convex portion 1422 in a vicinity of the periphery of the fourth lens element 140.

An example embodiment of the fifth lens element 150 has positive refractive power. The object-side surface 151 is a convex surface comprising a convex portion 1511 in a vicinity of the optical axis and a convex portion 1512 in a vicinity of a periphery of the fifth lens element 150. The image-side surface 152 is a concave surface comprising a concave portion 1521 in a vicinity of the optical axis and a concave portion 1522 in a vicinity of the periphery of the fifth lens element 150.

An example embodiment of the sixth lens element 160 has negative refractive power. The object-side surface 161 comprises a convex portion 1611 in a vicinity of the optical axis and a concave portion 1612 in a vicinity of a periphery of the sixth lens element 160. The image-side surface 162 comprises a concave portion 1621 in a vicinity of the optical axis and a convex portion 1622 in a vicinity of the periphery of the sixth lens element 160.

In example embodiments, air gaps exist between the lens elements 110, 120, 130, 140, 150, 160, the filtering unit 170 and the image plane 180 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the sixth lens element 160, the air gap d6 existing between the sixth lens element 160 and the filtering unit 170, the air gap d7 existing between filtering unit 170 and the image plane 180 of the image sensor. However, in other embodiments, any of the aforesaid air gaps may not exist. The air gap d1 is denoted by G12, the air gap d2 is denoted by G23, the air gap d3 is denoted by G34, the air gap d4 is denoted by G45, the air gap d5 is denoted by G56, and the sum of d1, d2, d3, d4 and d45 is denoted by AAG.

FIG. 4 depicts the optical characteristics of each lens elements in the optical imaging lens 1 of the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The optical imaging lens 1 which shows that the distance from the object-side surface 111 of the first lens element 110 to the image plane 180 along the optical axis is 4.045 mm is shortened, compared with that of the conventional optical imaging lens.

The object-side surface 111 is constructed by glass material are spherical surfaces. The aspherical surfaces, including the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160, are all defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 5.

As illustrated in FIG. 3, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.008 mm. Therefore, the present embodiment improves the longitudinal spherical aberration with respect to different wavelengths.

Please refer to FIG. 3, astigmatism aberration in the sagittal direction (b) and astigmatism aberration in the tangential direction (c). The focus variation with respect to the three wavelengths in the whole field falls within ±0.12 mm. This reflects the optical imaging lens 1 of the present embodiment eliminates aberration effectively. Additionally, the closed curves represents dispersion is improved.

Please refer to FIG. 3, distortion aberration (d), which showing the distortion aberration of the optical imaging lens 1 is within ±60%.

Therefore, the optical imaging lens 1 of the present embodiment shows great characteristics in the longitudinal spherical aberration, astigmatism in the sagittal direction, astigmatism in the tangential direction, and distortion aberration. According to above illustration, the optical imaging lens 1 of the example embodiment indeed achieves great optical performance and the length of the optical imaging lens 1 is effectively shortened.

Figure 6:
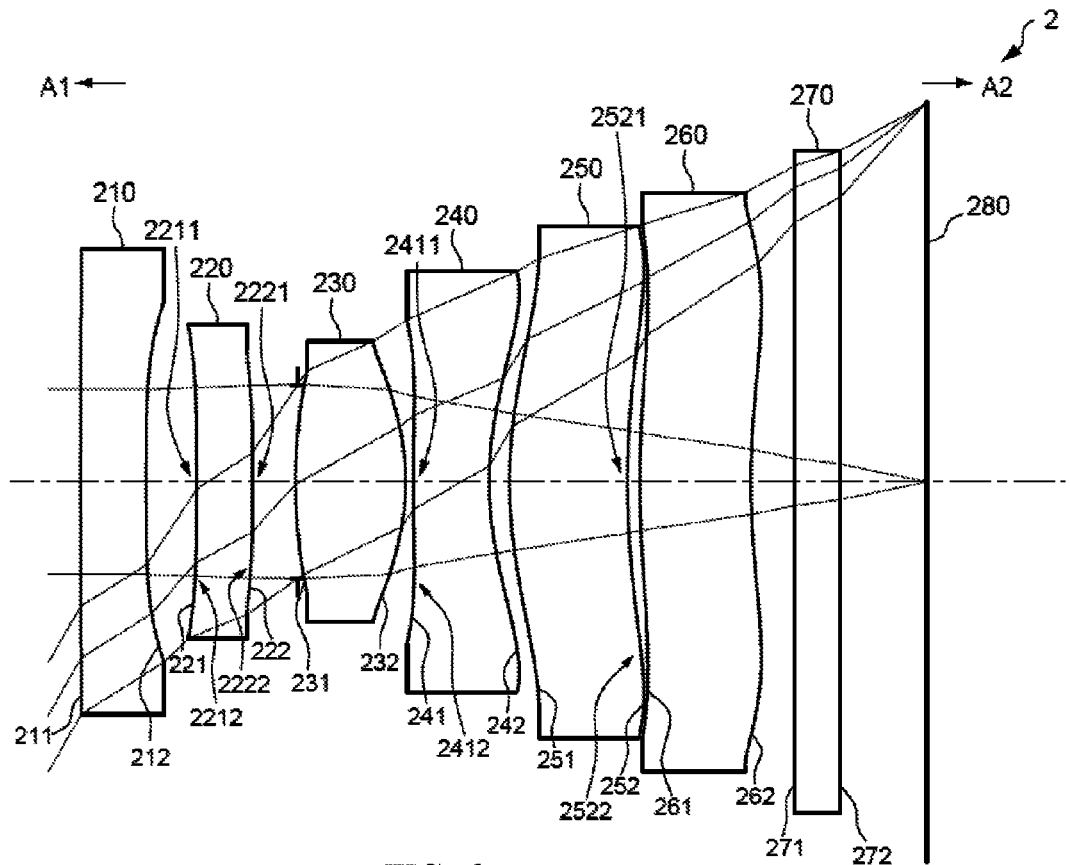
FIG. 6 is a cross-sectional view of a second embodiment of an optical imaging lens having six lens elements according to the present disclosure.
Figure 7:
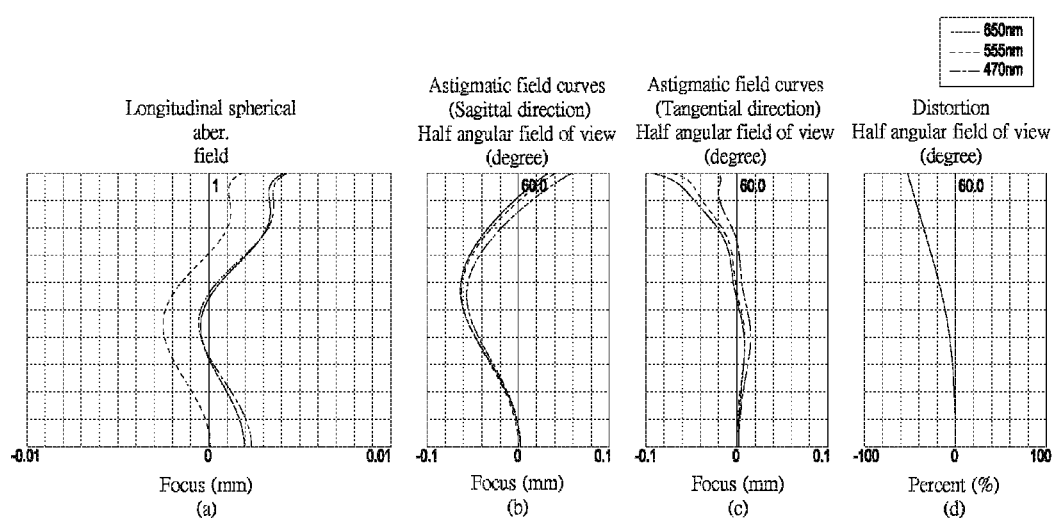
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having six lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises a first lens element 210, a second lens element 220, an aperture stop 200, a third lens element 230, a fourth lens element 240, a fifth lens element 250 and a sixth lens element 260.

The differences between the second embodiment and the first embodiment are the radius of curvature and thickness of each lens element, the distance of each air gap and the configuration of the concave/convex shape of the object-side surfaces 221, 241 and the image-side surfaces 222, 252, but the configuration of the positive/negative refractive power of the first, second, third, fourth, fifth and sixth lens elements 210, 220, 230, 240, 250, 260 and configuration of the concave/convex shape of surfaces, comprising the object-side surfaces 211, 231, 251, 261 facing to the object side A1 and the image-side surfaces 212, 232, 242, 262 facing to the image side A2, are similar to those in the first embodiment. Here, for clearly showing the drawings of the present embodiment, only the surface shapes which are different from that in the first embodiment are labeled. Specifically, the differences between the present and first embodiments are: the object-side surface 221 of the second lens element 220 is a concave surface comprising a concave portion 2211 in a vicinity of the optical axis and a concave portion 2212 in a vicinity of a periphery of the second lens element 220, the image-side surface 222 of the second lens element 220 is a convex surface comprising a convex portion 2221 in a vicinity of the optical axis and a convex portion 2222 in a vicinity of a periphery of the second lens element 220, the object-side surface 241 of the fourth lens element 240 comprises a convex portion 2411 in a vicinity of the optical axis and a concave portion 2412 in a vicinity of a periphery of the fourth lens element 240, the image-side surface 252 of the fifth lens element 250 comprises a concave portion 2521 in a vicinity of the optical axis and a convex portion 2522 in a vicinity of a periphery of the fifth lens element 250. Please refer to FIG. 8 for the optical characteristics and their air gaps of each lens elements in the optical imaging lens 2 the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The optical imaging lens 2 which shows that the distance from the object-side surface 211 of the first lens element 210 to the image plane 280 along the optical axis is 3.866 mm and the length of the optical imaging lens 2 is shortened, compared with that of the conventional optical imaging lens and even with the optical imaging lens 1 of the first embodiment.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which is within ±0.005 mm, and it also shows a better characteristics in the astigmatism in the sagittal direction (b), astigmatism in the tangential direction (c), which are within ±0.1 mm. Therefore, according to the above illustration, the optical imaging lens of the present embodiment indeed shows great optical performance and the length of the optical imaging lens 2 is effectively shortened that are even better than the first embodiment.

Figure 10:
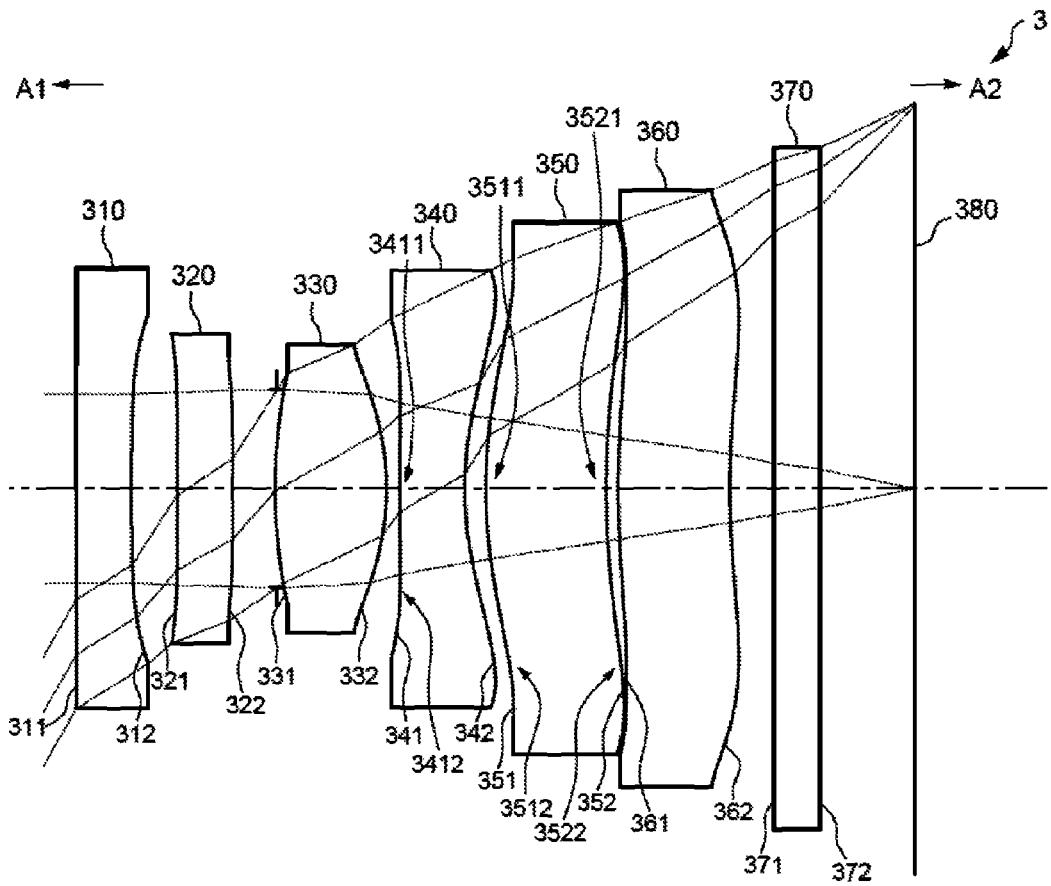
FIG. 10 is a cross-sectional view of a third embodiment of an optical imaging lens having six lens elements according to the present disclosure.
Figure 11:
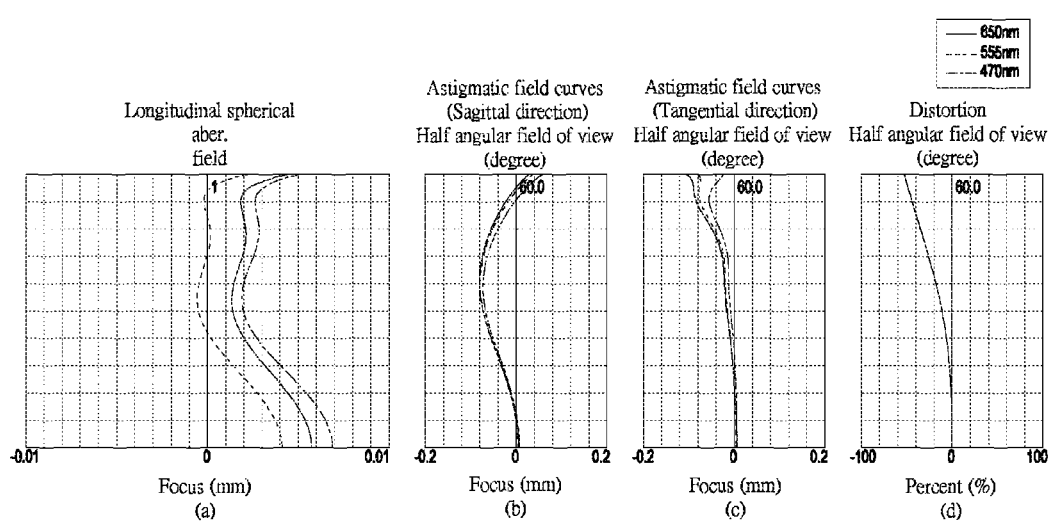
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having six lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises a first lens element 310, a second lens element 320, an aperture stop 300, a third lens element 330, a fourth lens element 340, a fifth lens element 350 and a sixth lens element 360.

The differences between the third embodiment and the first embodiment are the radius of curvature and thickness of each lens element, the distance of each air gap, back focal length, and the refraction power of the second lens element 320, configuration of the concave/convex shape of the object-side surfaces 341, 351 and the image-side surface 352, but the configuration of the positive/negative refractive power of the first, third, fourth, fifth and sixth lens elements 310, 330, 340, 350, 360 and configuration of the concave/convex shape of surfaces, comprising the object-side surfaces 311, 321, 331, 361 facing to the object side A1 and the image-side surfaces 312, 322, 332, 342, 362 facing to the image side A2, are similar to those in the first embodiment. Here, for clearly showing the drawings of the present embodiment, only the surface shapes which are different from that in the first embodiment are labeled. Specifically, the differences between the present and first embodiments are: the refraction power of the second lens elements 320 is negative, the object-side surface 341 of the fourth lens element 340 comprises a convex portion 3411 in a vicinity of the optical axis and a concave portion 3412 in a vicinity of a periphery of the fourth lens element 340, the object-side surface 351 of the fifth lens element 350 comprises a convex portion 3511 in a vicinity of the optical axis and a concave portion 3512 in a vicinity of a periphery of the fifth lens element 350, the image-side surface 352 of the fifth lens element 350 comprises a concave portion 3521 in a vicinity of the optical axis and a convex portion 3522 in a vicinity of a periphery of the firth lens element 350. Please refer to FIG. 12 for the optical characteristics and their air gaps of each lens elements in the optical imaging lens 3 the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment. refractive power The optical imaging lens 3 which shows that the distance from the object-side surface 311 of the first lens element 310 to the image plane 380 along the optical axis is 3.812 mm and the length of the optical imaging lens 3 is shortened, compared with that of the conventional optical imaging lens and even with the optical imaging lens 1 of the first embodiment.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which is within ±0.007 mm and even better than that of the first embodiment. Therefore, according to the above illustration, the optical imaging lens of the present embodiment indeed shows great optical performance and the length of the optical imaging lens 3 is effectively shortened.

Figure 14:
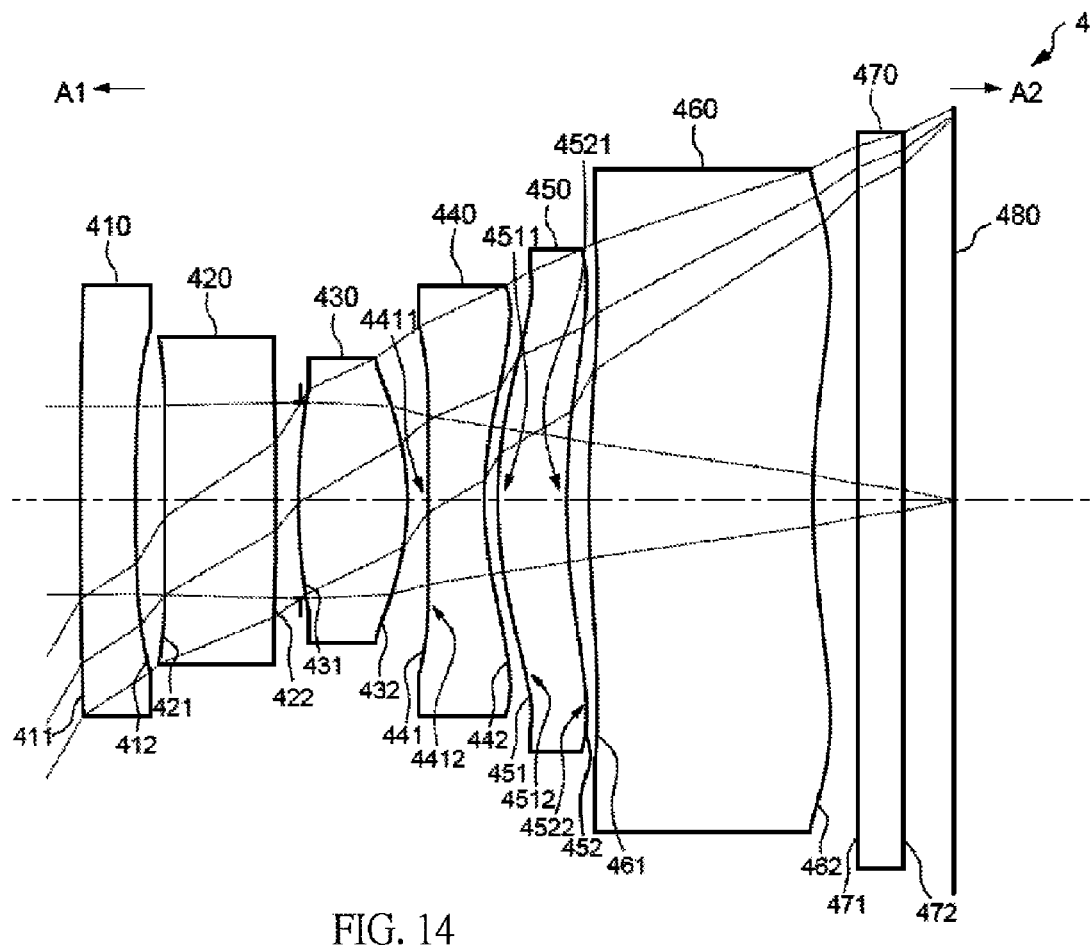
FIG. 14 is a cross-sectional view of a fourth embodiment of an optical imaging lens having six lens elements according to the present disclosure.
Figure 15:
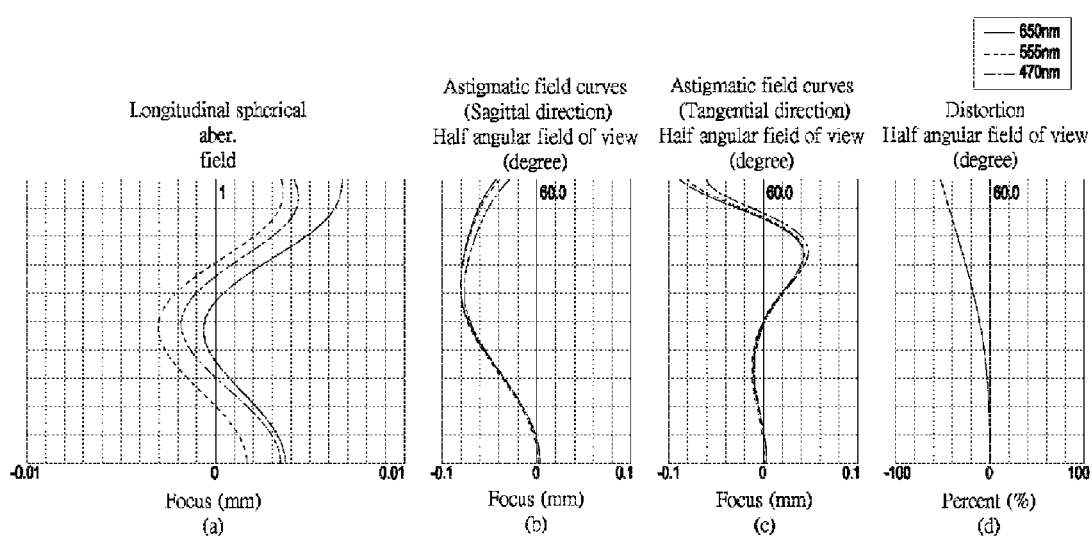
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having six lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises a first lens element 410, a second lens element 420, an aperture stop 400, a third lens element 430, a fourth lens element 440, a fifth lens element 450 and a sixth lens element 460.

The differences between the fourth embodiment and the first embodiment are the radius of curvature and thickness of each lens element, the distance of each air gap, back focal length, and the refraction power of the second lens element 420, configuration of the concave/convex shape of the object-side surfaces 441, 451 and the image-side surface 452, but the configuration of the positive/negative refractive power of the first, third, fourth, fifth and sixth lens elements 410, 430, 440, 450, 460 and configuration of the concave/convex shape of surfaces, comprising the object-side surfaces 411, 421, 431, 461 facing to the object side A1 and the image-side surfaces 412, 422, 432, 442, 462 facing to the image side A2, are similar to those in the first embodiment. Here, for clearly showing the drawings of the present embodiment, only the surface shapes which are different from that in the first embodiment are labeled. Specifically, the differences between the present and first embodiments are: the refraction power of the second lens elements 420 is negative, the object-side surface 441 of the fourth lens element 440 comprises a convex portion 4411 in a vicinity of the optical axis and a concave portion 4412 in a vicinity of a periphery of the fourth lens element 440, the object-side surface 451 of the fifth lens element 450 comprises a convex portion 4511 in a vicinity of the optical axis and a concave portion 4512 in a vicinity of a periphery of the fifth lens element 450, the image-side surface 452 of the fifth lens element 450 comprises a concave portion 4521 in a vicinity of the optical axis and a convex portion 4522 in a vicinity of a periphery of the fifth lens element 450. Please refer to FIG. 16 for the optical characteristics and their air gaps of each lens elements in the optical imaging lens 4 the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The optical imaging lens 4 which shows that the distance from the object-side surface 411 of the first lens element 410 to the image plane 480 along the optical axis is 3.935 mm and the length of the optical imaging lens 4 is shortened, compared with that of the conventional optical imaging lens and even with that of the optical imaging lens 1 of the first embodiment.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which is within ±0.007 mm, and it also shows a better characteristics in the astigmatism in the sagittal direction (b), astigmatism in the tangential direction (c), which are within ±0.1 mm. Therefore, according to the above illustration, the optical imaging lens of the present embodiment indeed shows great optical performance and the length of the optical imaging lens 4 is effectively shortened.

Figure 18:
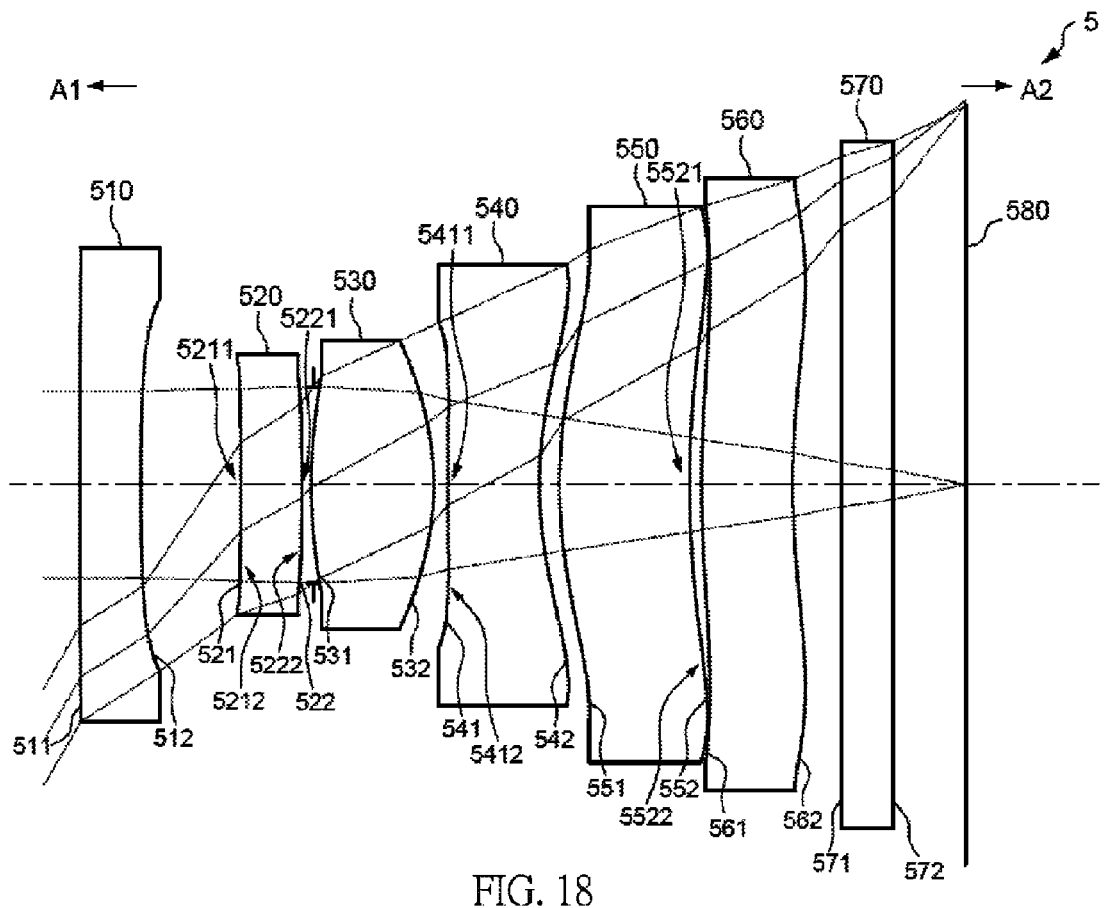
FIG. 18 is a cross-sectional view of a fifth embodiment of an optical imaging lens having six lens elements according to the present disclosure.
Figure 19:
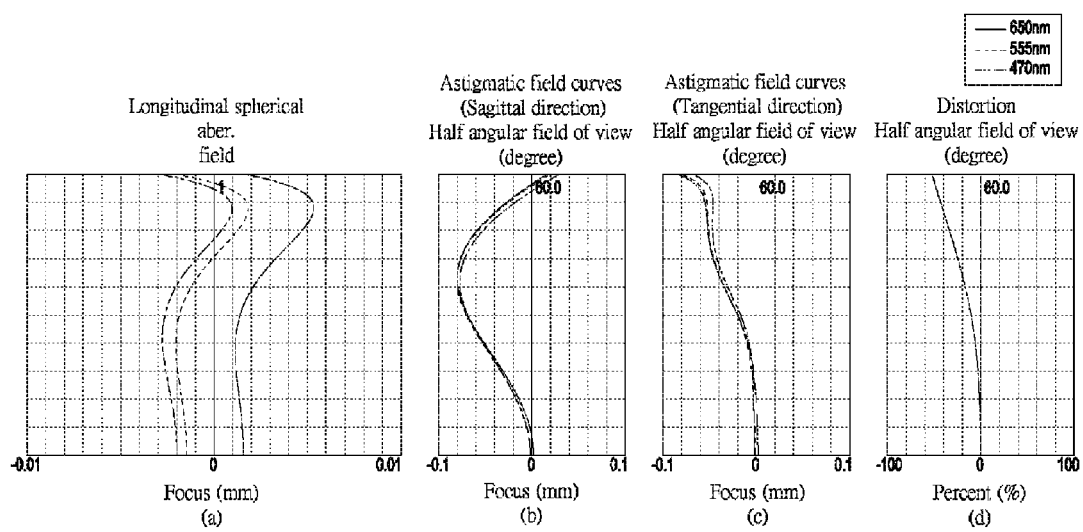
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having six lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises a first lens element 510, a second lens element 520, an aperture stop 500, a third lens element 530, a fourth lens element 540, a fifth lens element 550 and a sixth lens element 560.

The differences between the fifth embodiment and the first embodiment are the radius of curvature and thickness of each lens element, the distance of each air gap, back focal length, configuration of the concave/convex shape of the object-side surfaces 521, 541, and the image-side surfaces 522, 552, but the configuration of the positive/negative refractive power of the first, second, third, fourth, fifth and sixth lens elements 510, 520, 530, 540, 550, 560 and configuration of the concave/convex shape of surfaces, comprising the object-side surfaces 511, 531, 551, 561 facing to the object side A1 and the image-side surfaces 512, 532, 542, 562 facing to the image side A2, are similar to those in the first embodiment. Here, for clearly showing the drawings of the present embodiment, only the surface shapes which are different from that in the first embodiment are labeled. Specifically, the differences between the present and first embodiments are: the object-side surface 521 of the second lens element 520 is a concave surface comprising a concave portion 5211 in a vicinity of the optical axis and a concave portion 5212 in a vicinity of a periphery of the second lens element 520, the image-side surface 522 of the second lens element 520 is a convex surface comprising a convex portion 5221 in a vicinity of the optical axis and a convex portion 5222 in a vicinity of a periphery of the second lens element 520, the object-side surface 541 of the fourth lens element 540 comprises a convex portion 5411 in a vicinity of the optical axis and a concave portion 5412 in a vicinity of a periphery of the fourth lens element 540, the image-side surface 552 of the fifth lens element 550 comprises a concave portion 5521 in a vicinity of the optical axis and a convex portion 5522 in a vicinity of a periphery of the fifth lens element 550. Please refer to FIG. 20 for the optical characteristics and their air gaps of each lens elements in the optical imaging lens 5 the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The optical imaging lens 5 which shows that the distance from the object-side surface 511 of the first lens element 510 to the image plane 580 along the optical axis is 3.639 mm and the length of the optical imaging lens 5 is shortened, compared with that of the conventional optical imaging lens and even with that of the optical imaging lens 1 of the first embodiment.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which is within ±0.006 mm, and it also shows a better characteristics in the astigmatism in the sagittal direction (b), astigmatism in the tangential direction (c), which are within ±0.1 mm. Therefore, according to the above illustration, the optical imaging lens of the present embodiment indeed shows great optical performance and the length of the optical imaging lens 5 is effectively shortened.

Figure 22:
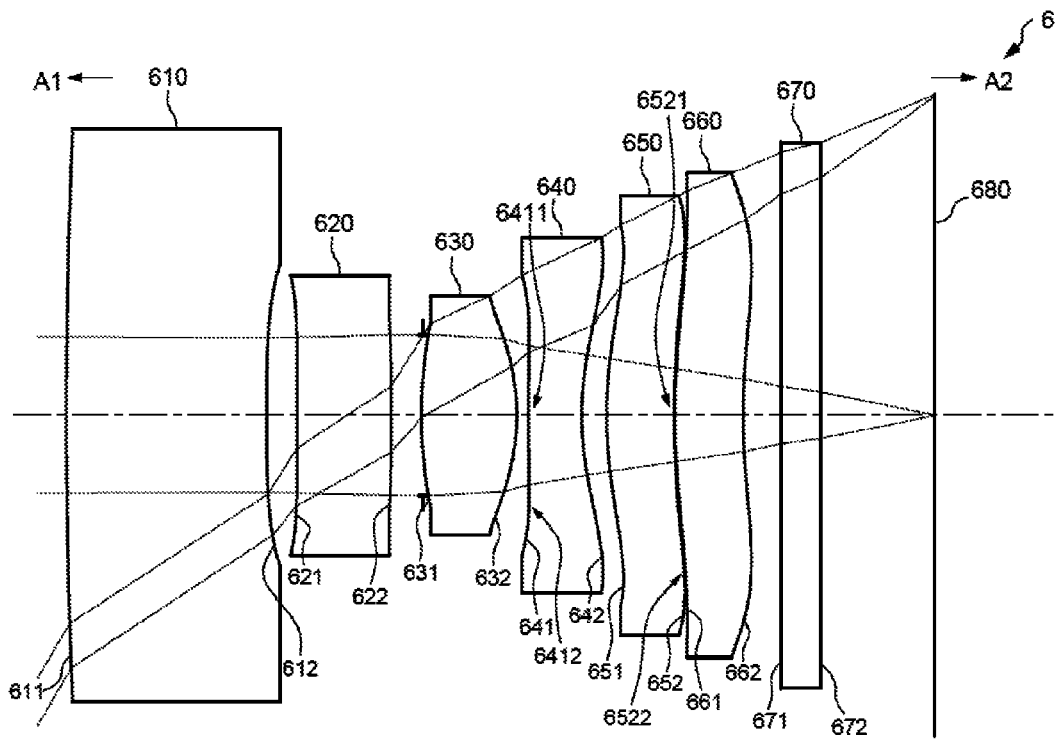
FIG. 22 is a cross-sectional view of a sixth embodiment of an optical imaging lens having six lens elements according to the present disclosure.
Figure 23:
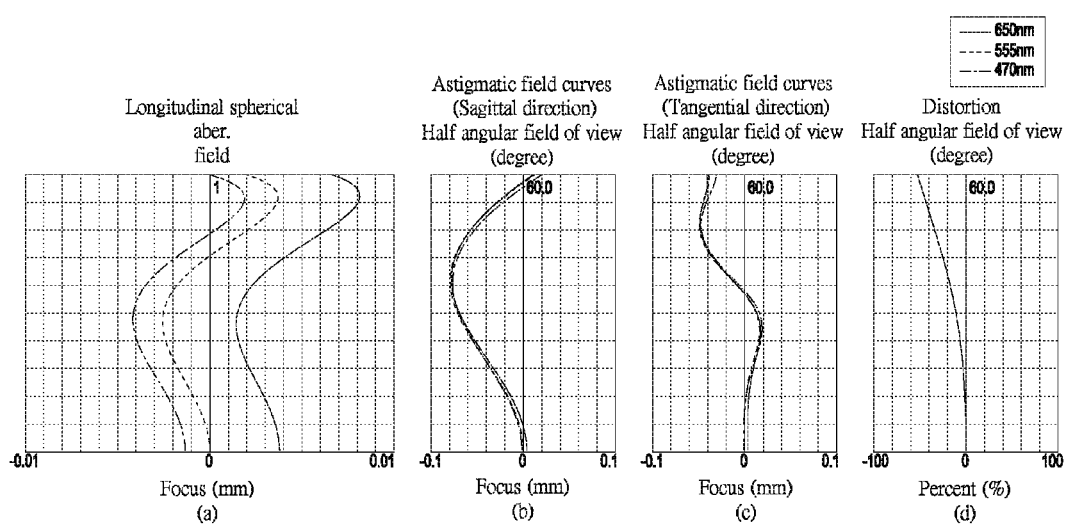
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having six lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises a first lens element 610, a second lens element 620, an aperture stop 600, a third lens element 630, a fourth lens element 640, a fifth lens element 650 and a sixth lens element 660.

The differences between the sixth embodiment and the first embodiment are the radius of curvature and thickness of each lens element and the distance of each air gap, back focal length, and the refraction power of the second lens element 620, configuration of the concave/convex shape of the object-side surface 641, and the image-side surface 652, but the configuration of the positive/negative refractive power of the first, third, fourth, fifth and sixth lens elements 610, 630, 640, 650, 660 and configuration of the concave/convex shape of surfaces, comprising the object-side surfaces 611, 621, 631, 651, 661 facing to the object side A1 and the image-side surfaces 612, 622, 632, 642, 662 facing to the image side A2, are similar to those in the first embodiment. Specifically, the differences between the present and first embodiments are: the refraction power of the second lens elements 620 is negative, the object-side surface 641 of the fourth lens element 640 comprises a convex portion 6411 in a vicinity of the optical axis and a concave portion 6412 in a vicinity of a periphery of the fourth lens element 640, the image-side surface 652 of the fifth lens element 650 comprises a concave portion 6521 in a vicinity of the optical axis and a convex portion 6522 in a vicinity of a periphery of the fifth lens element 650. Please refer to FIG. 24 for the optical characteristics and their air gaps of each lens elements in the optical imaging lens 6 the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The optical imaging lens 6 which shows that the distance from the object-side surface 611 of the first lens element 610 to the image plane 680 along the optical axis is 4.555 mm and the length of the optical imaging lens 6 is shortened compared with that of the conventional optical imaging lens.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). The present embodiment shows a better characteristics in the sagittal direction (b), astigmatism in the tangential direction (c), which are within ±0.1 mm. Therefore, according to the above illustration, the optical imaging lens of the present embodiment indeed shows great optical performance and the length of the optical imaging lens 6 is effectively shortened.

Figure 26:
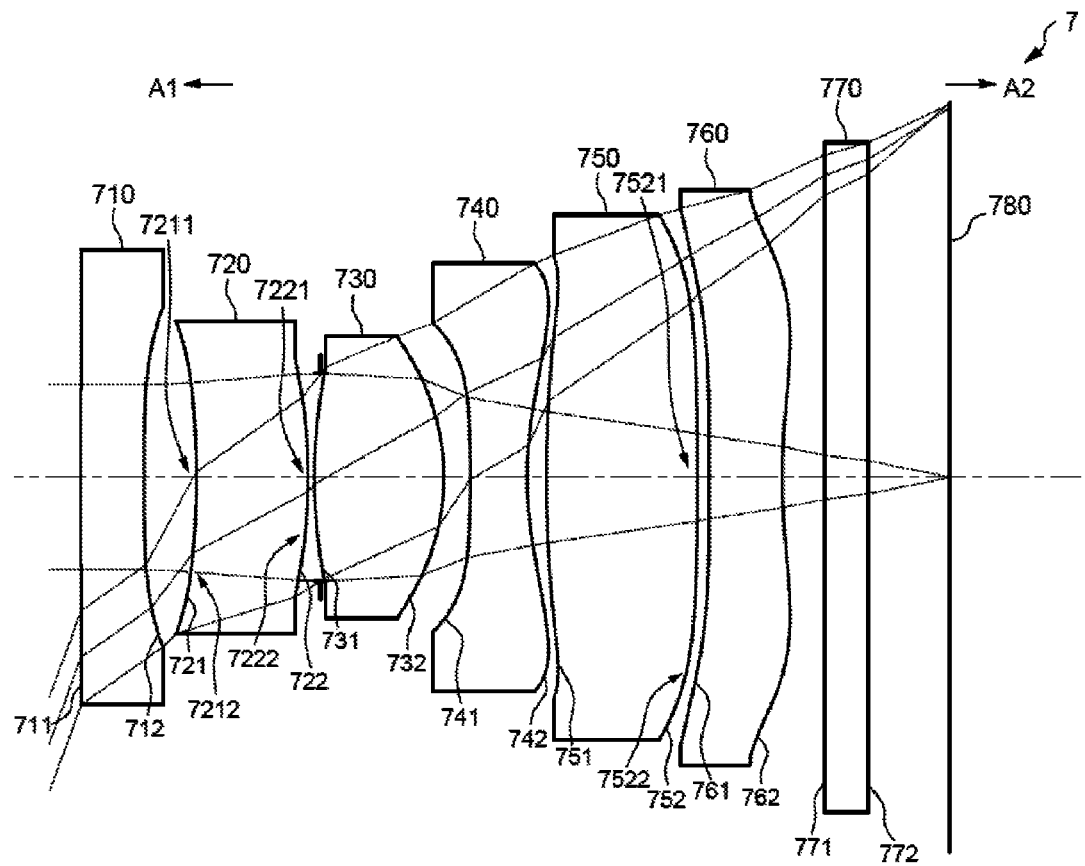
FIG. 26 is a cross-sectional view of a seventh embodiment of an optical imaging lens having six lens elements according to the present disclosure.
Figure 27:
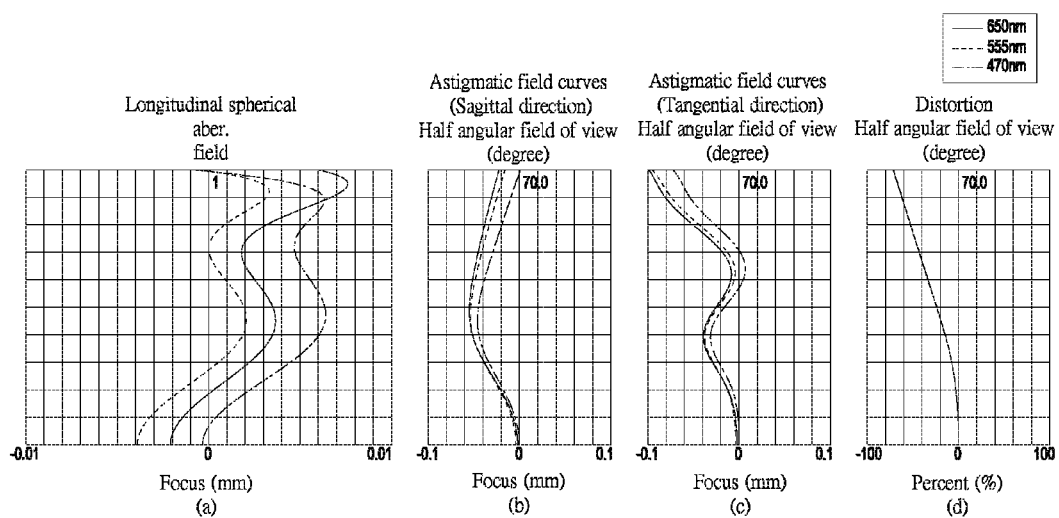
FIG. 27 is a chart of longitudinal spherical aberration and other kinds of optical aberrations of a seventh embodiment of the optical imaging lens according the present disclosure.

Reference is now made to FIGS. 26-29. FIG. 26 illustrates an example cross-sectional view of an optical imaging lens 7 having six lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises a first lens element 710, a second lens element 720, an aperture stop 700, a third lens element 730, a fourth lens element 740, a fifth lens element 750 and a sixth lens element 760.

The differences between the seventh embodiment and the first embodiment are the radius of curvature and thickness of each lens element, the distance of each air gap, back focal length, configuration of the concave/convex shape of the object-side surface 721, and the image-side surfaces 722, 752, but the configuration of the positive/negative refractive power of the first, second, third, fourth, fifth and sixth lens elements 710, 720, 730, 740, 750, 760 and configuration of the concave/convex shape of surfaces, comprising the object-side surfaces 711, 731, 741, 751, 761 facing to the object side A1 and the image-side surfaces 712, 732, 742, 762 facing to the image side A2, are similar to those in the first embodiment. Here, for clearly showing the drawings of the present embodiment, only the surface shapes which are different from that in the first embodiment are labeled. Specifically, the differences between the present and first embodiments are: the object-side surface 721 of the second lens element 720 is a concave surface comprising a concave portion 7211 in a vicinity of the optical axis and a concave portion 7212 in a vicinity of a periphery of the second lens element 720, the image-side surface 722 of the second lens element 720 is a convex surface comprising a convex portion 7221 in a vicinity of the optical axis and a convex portion 7222 in a vicinity of a periphery of the second lens element 720, the image-side surface 752 of the fifth lens element 750 is a convex surface comprising a convex portion 7521 in a vicinity of the optical axis and a convex portion 7522 in a vicinity of a periphery of the fifth lens element 750. Please refer to FIG. 28 for the optical characteristics and their air gaps of each lens elements in the optical imaging lens 5 the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The optical imaging lens 7 which shows that the distance from the object-side surface 711 of the first lens element 710 to the image plane 780 along the optical axis is 4.13 mm and the length of the optical imaging lens 7 is shortened, compared with that of the conventional optical imaging lens and even with that of the optical imaging lens 1 of the first embodiment. Additionally, the HFOV of the optical imaging lens 7 is 70, which is better than that of the optical imaging lens 1 of the first embodiment, and this is capable to enlarge the shot angle.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). The present embodiment shows a better characteristics in the sagittal direction (b), astigmatism in the tangential direction (c), which are within ±0.1 mm. Therefore, according to the above illustration, the optical imaging lens of the present embodiment indeed shows great optical performance and the length of the optical imaging lens 7 is effectively shortened.

Figure 30:
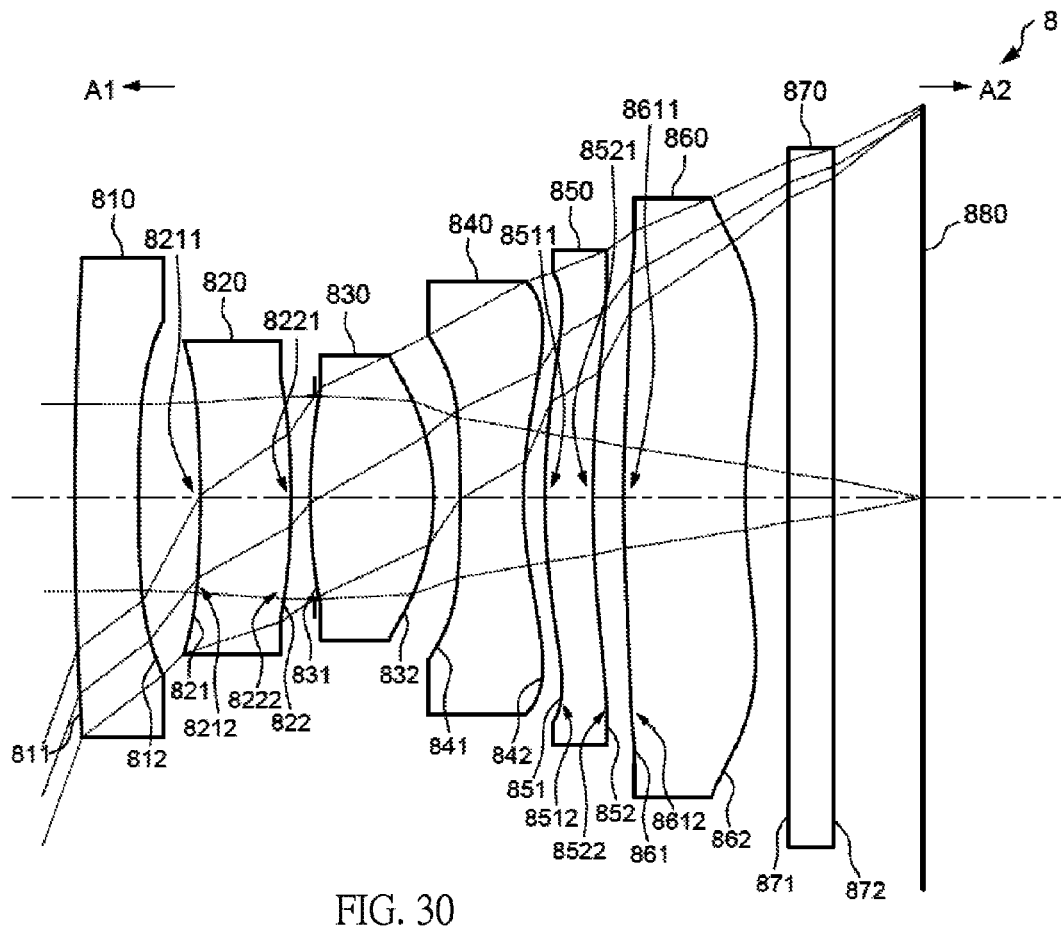
FIG. 30 is a cross-sectional view of an eighth embodiment of an optical imaging lens having six lens elements according to the present disclosure.
Figure 31:
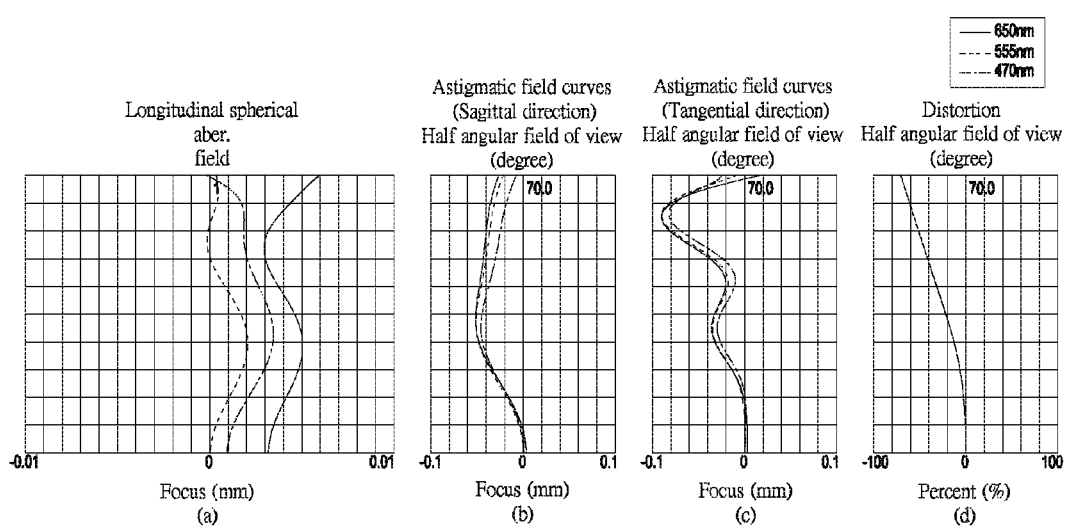
FIG. 31 is a chart of longitudinal spherical aberration and other kinds of optical aberrations of an eighth embodiment of the optical imaging lens according the present disclosure.

Reference is now made to FIGS. 30-33. FIG. 30 illustrates an example cross-sectional view of an optical imaging lens 8 having six lens elements of the optical imaging lens according to an eighth example embodiment. FIG. 31 shows example charts of longitudinal spherical aberration and other kinds of optical aberrations of the optical imaging lens 8 according to the eighth embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the optical imaging lens 8 of the present embodiment, in an order from an object side A1 to an image side A2 along an optical axis, comprises a first lens element 810, a second lens element 820, an aperture stop 800, a third lens element 830, a fourth lens element 840, a fifth lens element 850 and a sixth lens element 860.

The differences between the eighth embodiment and the first embodiment are the radius of curvature and thickness of each lens element, the distance of each air gap, back focal length, configuration of the concave/convex shape of the object-side surfaces 821, 851, 861 and the image-side surfaces 822, 852, but the configuration of the positive/negative refractive power of the first, second, third, fourth, fifth and sixth lens elements 810, 820, 830, 840, 850, 860 and configuration of the concave/convex shape of surfaces, comprising the object-side surfaces 811, 831, 841 facing to the object side A1 and the image-side surfaces 812, 832, 842, 862 facing to the image side A2, are similar to those in the first embodiment. Here, for clearly showing the drawings of the present embodiment, only the surface shapes which are different from that in the first embodiment are labeled. Specifically, the differences between the present and first embodiments are: the object-side surface 821 of the second lens element 820 is a concave surface comprising a concave portion 8211 in a vicinity of the optical axis and a concave portion 8212 in a vicinity of a periphery of the second lens element 820, the image-side surface 822 of the second lens element 820 is a convex surface comprising a convex portion 8221 in a vicinity of the optical axis and a convex portion 8222 in a vicinity of a periphery of the second lens element 820, the object-side surface 851 of the fifth lens element 850 comprises a convex portion 8511 in a vicinity of the optical axis and a concave portion 8512 in a vicinity of a periphery of the fifth lens element 850, the image-side surface 852 of the fifth lens element 850 comprises a concave portion 8521 in a vicinity of the optical axis and a convex portion 8522 in a vicinity of a periphery of the fifth lens element 850, the object-side surface 861 of the sixth lens element 860 is a convex surface comprising a convex portion 8611 in a vicinity of the optical axis and a convex portion 8612 in a vicinity of a periphery of the sixth lens element 860. Please refer to FIG. 32 for the optical characteristics and their air gaps of each lens elements in the optical imaging lens 5 the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The optical imaging lens 8 which shows that the distance from the object-side surface 811 of the first lens element 810 to the image plane 880 along the optical axis is 3.942 mm and the length of the optical imaging lens 8 is shortened, compared with that of the conventional optical imaging lens and even with that of the optical imaging lens 1 of the first embodiment.

As shown in FIG. 31, the optical imaging lens 8 of the present embodiment shows great characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which is within ±0.006 mm, and it also shows a better characteristics in the astigmatism in the sagittal direction (b), astigmatism in the tangential direction (c), which are within ±0.1 mm. Therefore, according to the above illustration, the optical imaging lens of the present embodiment indeed shows great optical performance and the length of the optical imaging lens 8 is effectively shortened.

Figure 34:
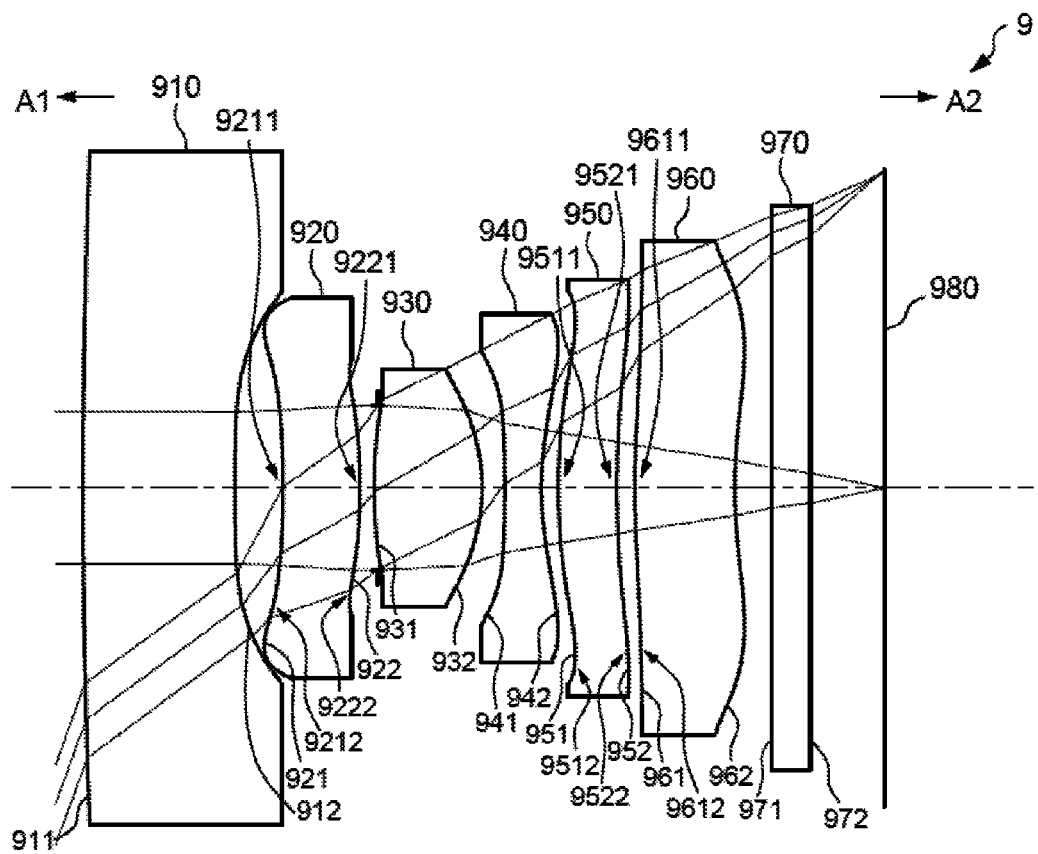
FIG. 34 is a cross-sectional view of an ninth embodiment of an optical imaging lens having six lens elements according to the present disclosure.
Figure 35:
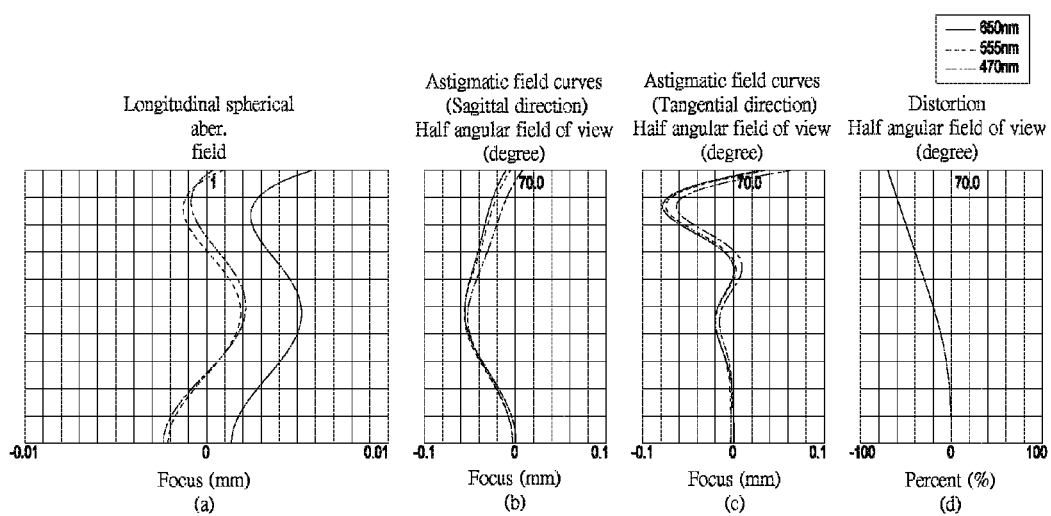
FIG. 35 is a chart of longitudinal spherical aberration and other kinds of optical aberrations of an ninth embodiment of the optical imaging lens according the present disclosure.

Reference is now made to FIGS. 34-37. FIG. 34 illustrates an example cross-sectional view of an optical imaging lens 9 having six lens elements of the optical imaging lens according to an ninth example embodiment. FIG. 35 shows example charts of longitudinal spherical aberration and other kinds of optical aberrations of the optical imaging lens 9 according to the ninth embodiment. FIG. 36 shows an example table of optical data of each lens element of the optical imaging lens 9 according to the ninth example embodiment. FIG. 37 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 34, the optical imaging lens 9 of the present embodiment, in an order from an object side A1 to an image side A2 along an optical axis, comprises a first lens element 910, a second lens element 920, an aperture stop 900, a third lens element 930, a fourth lens element 940, a fifth lens element 950 and a sixth lens element 960.

The differences between the ninth embodiment and the first embodiment are the radius of curvature and thickness of each lens element, the distance of each air gap, back focal length, configuration of the concave/convex shape of the object-side surfaces 921, 951, 961 and the image-side surfaces 922, 952, but the configuration of the positive/negative refractive power of the first, second, third, fourth, fifth and sixth lens elements 910, 920, 930, 940, 950, 960 and configuration of the concave/convex shape of surfaces, comprising the object-side surfaces 911, 931, 941 facing to the object side A1 and the image-side surfaces 912, 932, 942, 962 facing to the image side A2, are similar to those in the first embodiment. Here, for clearly showing the drawings of the present embodiment, only the surface shapes which are different from that in the first embodiment are labeled. Specifically, the differences between the present and first embodiments are: the object-side surface 921 of the second lens element 920 is a concave surface comprising a concave portion 9211 in a vicinity of the optical axis and a concave portion 9212 in a vicinity of a periphery of the second lens element 920, the image-side surface 922 of the second lens element 920 is a convex surface comprising a convex portion 9221 in a vicinity of the optical axis and a convex portion 9222 in a vicinity of a periphery of the second lens element 920, the object-side surface 951 of the fifth lens element 950 comprises a convex portion 9511 in a vicinity of the optical axis and a concave portion 9512 in a vicinity of a periphery of the fifth lens element 950, the image-side surface 952 of the fifth lens element 950 comprises a concave portion 9521 in a vicinity of the optical axis and a convex portion 9522 in a vicinity of a periphery of the fifth lens element 950, the object-side surface 961 of the sixth lens element 960 is a convex surface comprising a convex portion 9611 in a vicinity of the optical axis and a convex portion 9612 in a vicinity of a periphery of the sixth lens element 960. Please refer to FIG. 36 for the optical characteristics and their air gaps of each lens elements in the optical imaging lens 5 the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The optical imaging lens 9 which shows that the distance from the object-side surface 911 of the first lens element 910 to the image plane 980 along the optical axis is 4.351 mm and the length of the optical imaging lens 9 is shortened, compared with that of the conventional optical imaging lens.

As shown in FIG. 35, the optical imaging lens 9 of the present embodiment shows great characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which is within ±0.006 mm, and it also shows a better characteristics in the astigmatism in the sagittal direction (b), astigmatism in the tangential direction (c), which are within ±0.1 mm. Therefore, according to the above illustration, the optical imaging lens of the present embodiment indeed shows great optical performance and the length of the optical imaging lens 9 is effectively shortened.

Figure 38:
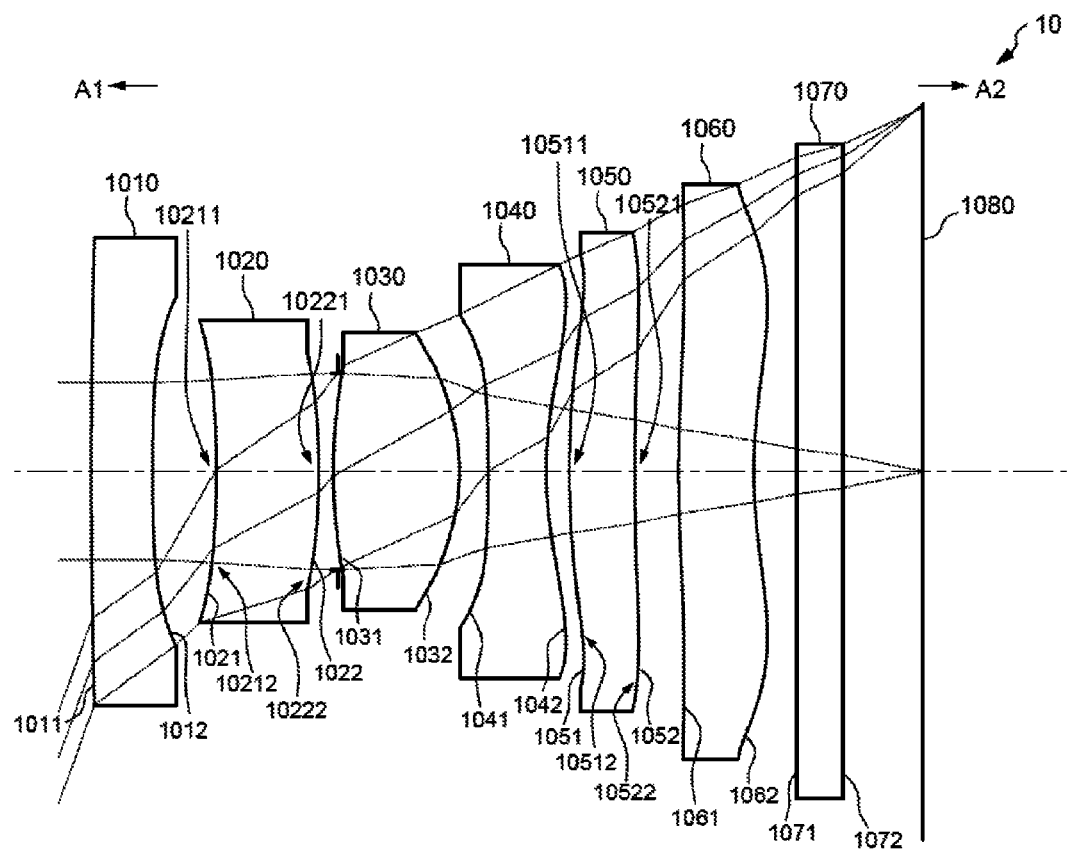
FIG. 38 is a cross-sectional view of a tenth embodiment of an optical imaging lens having six lens elements according to the present disclosure.
Figure 39:
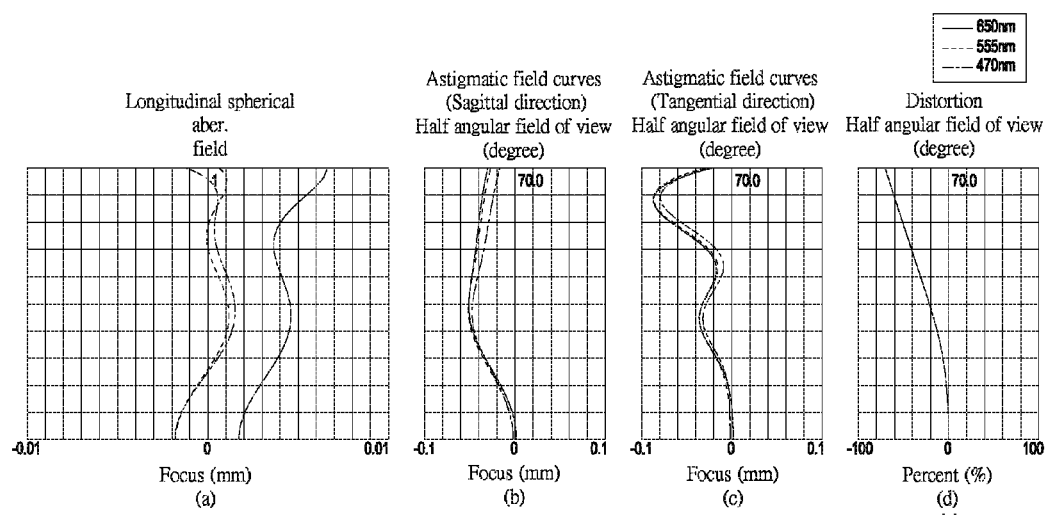
FIG. 39 is a chart of longitudinal spherical aberration and other kinds of optical aberrations of a tenth embodiment of the optical imaging lens according the present disclosure.

Reference is now made to FIGS. 38-41. FIG. 38 illustrates an example cross-sectional view of an optical imaging lens 10 having six lens elements of the optical imaging lens according to an tenth example embodiment. FIG. 38 shows example charts of longitudinal spherical aberration and other kinds of optical aberrations of the optical imaging lens 10 according to the tenth embodiment. FIG. 39 shows an example table of optical data of each lens element of the optical imaging lens 10 according to the tenth example embodiment. FIG. 40 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 38, the optical imaging lens 10 of the present embodiment, in an order from an object side A1 to an image side A2 along an optical axis, comprises a first lens element 1010, a second lens element 1020, an aperture stop 1000, a third lens element 1030, a fourth lens element 1040, a fifth lens element 1050 and a sixth lens element 1060.

The differences between the tenth embodiment and the first embodiment are the radius of curvature and thickness of each lens element, the distance of each air gap, back focal length, configuration of the concave/convex shape of the object-side surfaces 1021, 1051 and the image-side surfaces 1022, 1052, but the configuration of the positive/negative refractive power of the first, second, third, fourth, fifth and sixth lens elements 1010, 1020, 1030, 1040, 1050, 1060 and configuration of the concave/convex shape of surfaces, comprising the object-side surfaces 1011, 1031, 1041, 1061 facing to the object side A1 and the image-side surfaces 1012, 1032, 1042, 1062 facing to the image side A2, are similar to those in the first embodiment. Here, for clearly showing the drawings of the present embodiment, only the surface shapes which are different from that in the first embodiment are labeled. Specifically, the differences between the present and first embodiments are: the object-side surface 1021 of the second lens element 1020 is a concave surface comprising a concave portion 10211 in a vicinity of the optical axis and a concave portion 10212 in a vicinity of a periphery of the second lens element 1020, the image-side surface 1022 of the second lens element 1020 is a convex surface comprising a convex portion 10221 in a vicinity of the optical axis and a convex portion 10222 in a vicinity of a periphery of the second lens element 1020, the object-side surface 1051 of the fifth lens element 1050 comprises a convex portion 10511 in a vicinity of the optical axis and a concave portion 10512 in a vicinity of a periphery of the fifth lens element 1050, the image-side surface 1052 of the fifth lens element 1050 comprises a concave portion 10521 in a vicinity of the optical axis and a convex portion 10522 in a vicinity of a periphery of the fifth lens element 1050. Please refer to FIG. 40 for the optical characteristics and their air gaps of each lens elements in the optical imaging lens 5 the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The optical imaging lens 10 which shows that the distance from the object-side surface 1011 of the first lens element 1010 to the image plane 1080 along the optical axis is 3.812 mm and the length of the optical imaging lens 10 is shortened, compared with that of the conventional optical imaging lens.

As shown in FIG. 39, the optical imaging lens 10 of the present embodiment shows great characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which is within ±0.007 mm, and it also shows a better characteristics in the astigmatism in the sagittal direction (b), astigmatism in the tangential direction (c), which are within ±0.1 mm. Therefore, according to the above illustration, the optical imaging lens of the present embodiment indeed shows great optical performance and the length of the optical imaging lens 10 is effectively shortened.

Figure 42:
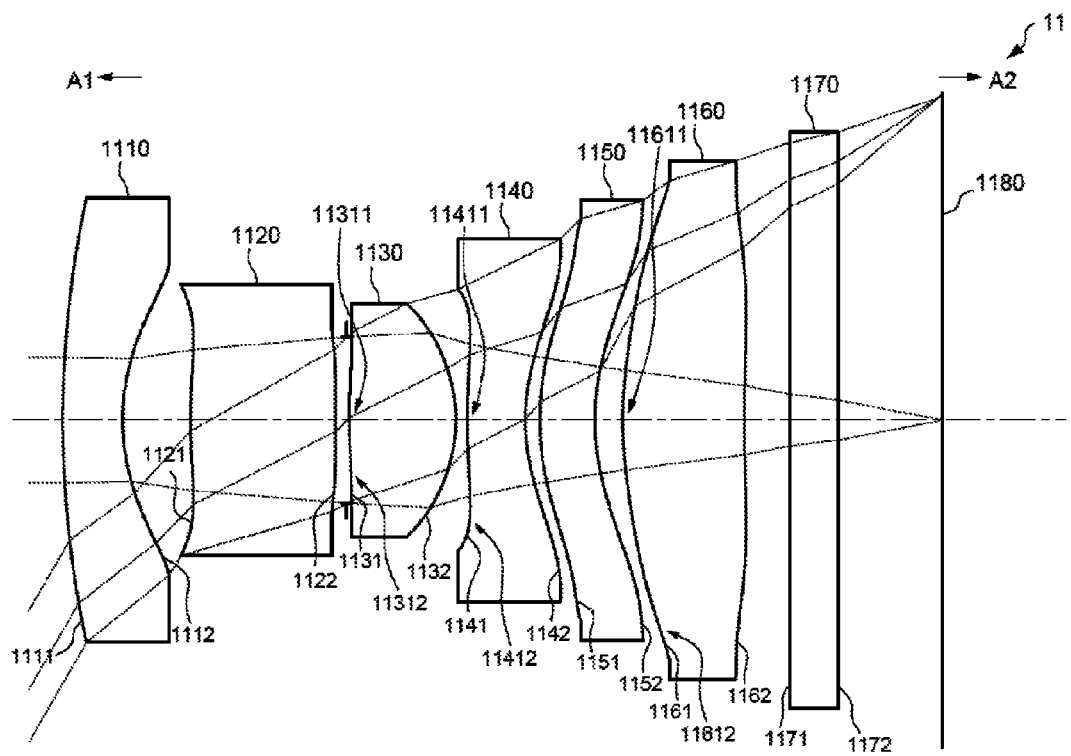
FIG. 42 is a cross-sectional view of a eleventh embodiment of an optical imaging lens having six lens elements according to the present disclosure.
Figure 43:
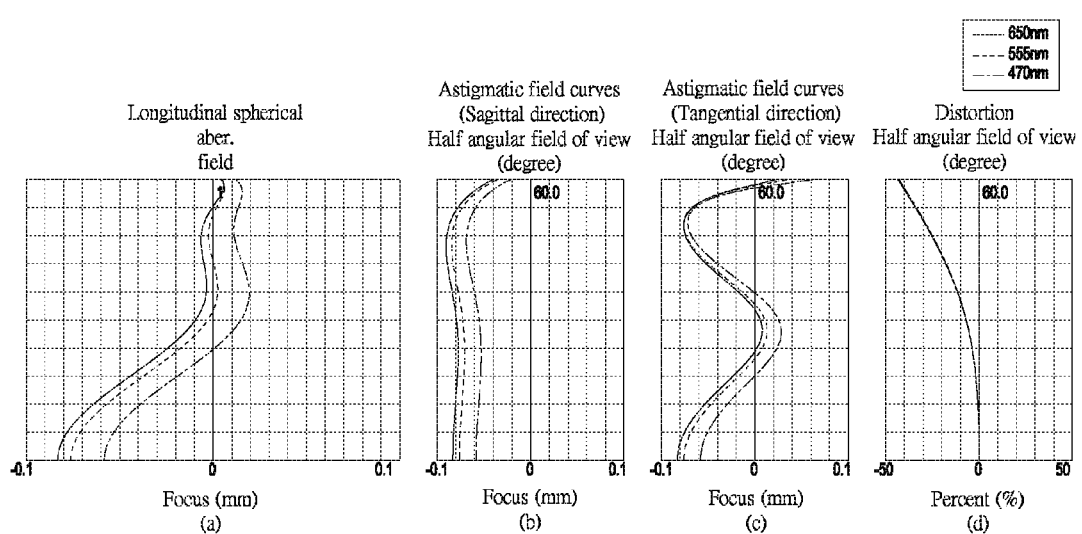
FIG. 43 is a chart of longitudinal spherical aberration and other kinds of optical aberrations of a eleventh embodiment of the optical imaging lens according the present disclosure.

Reference is now made to FIGS. 42-45. FIG. 42 illustrates an example cross-sectional view of an optical imaging lens 11 having six lens elements of the optical imaging lens according to a eleventh example embodiment. FIG. 43 shows example charts of longitudinal spherical aberration and other kinds of optical aberrations of the optical imaging lens 11 according to the eleventh embodiment. FIG. 44 shows an example table of optical data of each lens element of the optical imaging lens 11 according to the eleventh example embodiment. FIG. 45 shows an example table of aspherical data of the optical imaging lens 11 according to the eleventh example embodiment. The reference numbers labeled in the present embodiment are similar to those in the first embodiment for the similar elements, but here the reference numbers are initialed with 11, for example, reference number 1131 for labeling the object-side surface of the third lens element 1130, reference number 1132 for labeling the image-side surface of the third lens element 1130, etc.

As shown in FIG. 42, the optical imaging lens 11 of the present embodiment, in an order from an object side A1 to an image side A2 along an optical axis, comprises a first lens element 1110, a second lens element 1120, an aperture stop 1100, a third lens element 1130, a fourth lens element 1140, a fifth lens element 1150 and a sixth lens element 1160.

The differences between the eleventh embodiment and the first embodiment are the radius of curvature and thickness of each lens element, the distance of each air gap, back focal length, the configuration of the positive/negative refractive power of the fifth lens element 1150 and sixth lens element 1160, and the configuration of the concave/convex shape of the object-side surfaces 1131, 1141, 1161, but the configuration of the positive/negative refractive power of the first, second, third, and fourth lens elements 1110, 1120, 1130, 1140 and configuration of the concave/convex shape of surfaces, comprising the object-side surfaces 1111, 1121, 1151, facing to the object side A1 and the image-side surfaces 1112, 1122, 1132, 1142, 1152, 1162 facing to the image side A2, are similar to those in the first embodiment. Here, for clearly showing the drawings of the present embodiment, only the surface shapes which are different from that in the first embodiment are labeled. Specifically, the fifth lens element 1150 has a negative refractive power, the sixth lens element 1160 has a positive refractive power; the object-side surface 1131 of the third lens element 1130 comprises a convex portion 11311 in a vicinity of the optical axis and a concave portion 11312 in a vicinity of a periphery of the third lens element 1130, the object-side surface 1141 of the fourth lens element 1140 comprises a convex portion 11411 in a vicinity of the optical axis and a concave portion 11412 in a vicinity of a periphery of the fourth lens element 1140, the object-side surface 1161 of the sixth lens element 1160 is a convex surface comprising a convex portion 11611 in a vicinity of the optical axis and a convex portion 11612 in a vicinity of a periphery of the sixth lens element 1160. Please refer to FIG. 44 for the optical characteristics of each lens elements in the optical imaging lens 11 of the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The distance from the object-side surface 1111 of the first lens element 1110 to the image plane 1180 along the optical axis is 3.852 mm and the length of the optical imaging lens 11 is shortened compared with conventional optical imaging lenses. Thus, the optical imaging lens 11 is capable to provide excellent imaging quality for smaller sized mobile devices.

As shown in FIG. 43, the optical imaging lens 11 of the present embodiment shows great characteristics in longitudinal spherical aberration (a), astigmatism in the sagittal direction (b), astigmatism in the tangential direction (c), and distortion aberration (d). The present embodiment shows a better characteristics in the astigmatism in the sagittal direction (b), astigmatism in the tangential direction (c), which are within ±0.1 mm. Therefore, according to the above illustration, the optical imaging lens of the present embodiment indeed shows great optical performance and the length of the optical imaging lens 11 is effectively shortened.

Figure 46:
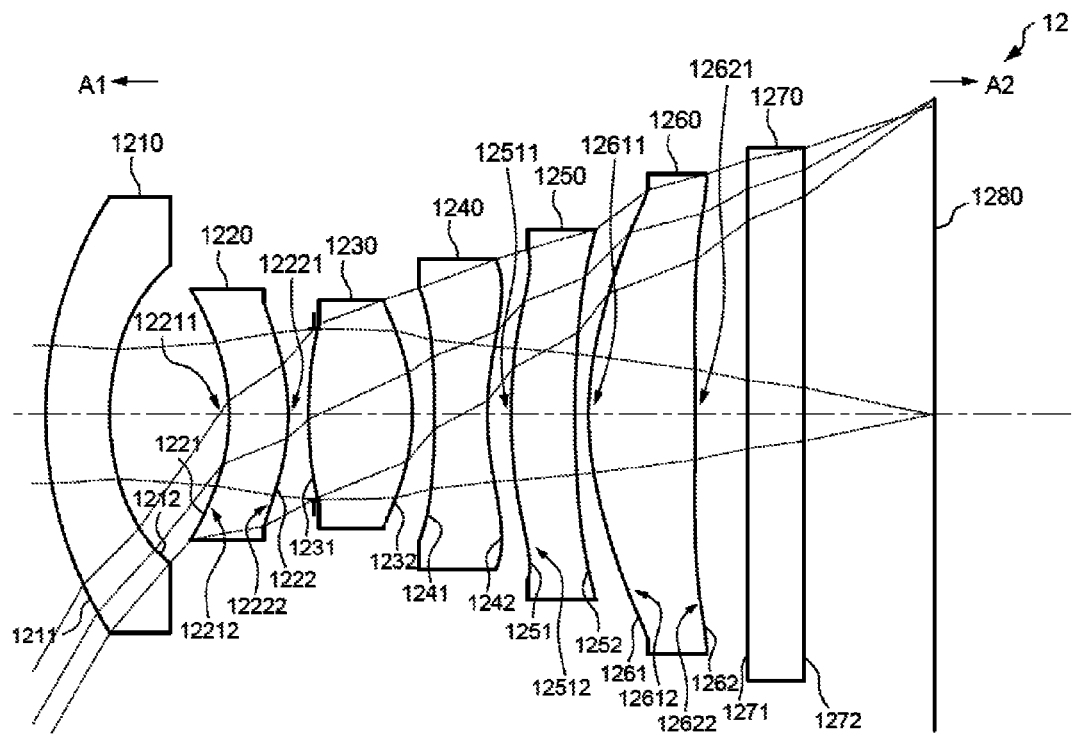
FIG. 46 is a cross-sectional view of a twelfth embodiment of an optical imaging lens having six lens elements according to the present disclosure.
Figure 47:
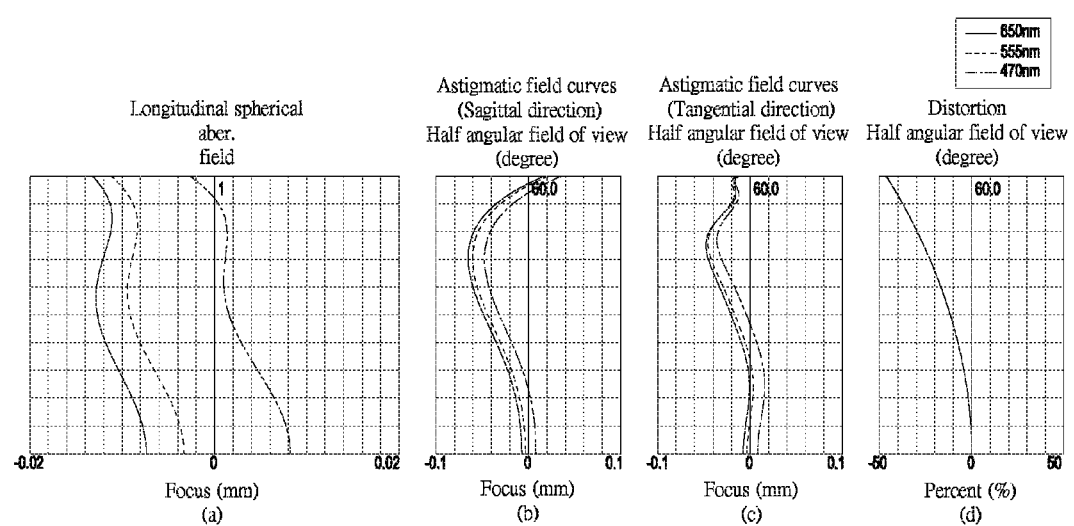
FIG. 47 is a chart of longitudinal spherical aberration and other kinds of optical aberrations of a twelfth embodiment of the optical imaging lens according the present disclosure.

Reference is now made to FIGS. 46-49. FIG. 46 illustrates an example cross-sectional view of an optical imaging lens 12 having six lens elements of the optical imaging lens according to a twelfth example embodiment. FIG. 46 shows example charts of longitudinal spherical aberration and other kinds of optical aberrations of the optical imaging lens 12 according to the twelfth embodiment. FIG. 47 shows an example table of optical data of each lens element of the optical imaging lens 12 according to the twelfth example embodiment. FIG. 48 shows an example table of aspherical data of the optical imaging lens 12 according to the twelfth example embodiment. The reference numbers labeled in the present embodiment are similar to those in the first embodiment for the similar elements, but here the reference numbers are initialed with 12, for example, reference number 1231 for labeling the object-side surface of the third lens element 1230, reference number 1232 for labeling the image-side surface of the third lens element 1230, etc.

As shown in FIG. 46, the optical imaging lens 12 of the present embodiment, in an order from an object side A1 to an image side A2 along an optical axis, comprises a first lens element 1210, a second lens element 1220, an aperture stop 1200, a third lens element 1230, a fourth lens element 1240, a fifth lens element 1250 and a sixth lens element 1260.

The differences between the twelfth embodiment and the first embodiment are the radius of curvature and thickness of each lens element, the distance of each air gap, back focal length, the configuration of the positive/negative refractive power of the second lens element 1220 and sixth lens element 1260, and the configuration of the concave/convex shape of the object-side surfaces 1221, 1251, 1261, and image-side surfaces 1222, 1262, but the configuration of the positive/negative refractive power of the first, third, fourth and fifth lens elements 1210, 1230, 1240, 1250 and configuration of the concave/convex shape of surfaces, comprising the object-side surfaces 1211, 1231, 1241, facing to the object side A1 and the image-side surfaces 1212, 1232, 1242, 1252, facing to the image side A2, are similar to those in the first embodiment. Here, for clearly showing the drawings of the present embodiment, only the surface shapes which are different from that in the first embodiment are labeled. Specifically, the second lens element 1220 has a negative refractive power, the sixth lens element 1260 has a positive refractive power; the object-side surface 1221 of the second lens element 1220 is a concave surface comprising a concave portion 12211 in a vicinity of the optical axis and a concave portion 12212 in a vicinity of a periphery of the second lens element 1220, the image-side surface 1222 of the second lens element 1220 is a convex surface comprising a convex portion 12221 in a vicinity of the optical axis and a convex portion 12222 in a vicinity of a periphery of the second lens element 1220; the object-side surface 1251 of the fifth lens element 1250 comprises a convex portion 12511 in a vicinity of the optical axis and a concave portion 12512 in a vicinity of a periphery of the fifth lens element 1250, the object-side surface 1261 of the sixth lens element 1260 is a convex surface comprising a convex portion 12611 in a vicinity of the optical axis and a convex portion 12612 in a vicinity of a periphery of the sixth lens element 1260, the image-side surface 1262 of the sixth lens element 1260 is a convex surface comprising a convex portion 12621 in a vicinity of the optical axis and a convex portion 12622 in a vicinity of a periphery of the sixth lens element 1260. Please refer to FIG. 48 for the optical characteristics of each lens elements in the optical imaging lens 11 of the present embodiment, and please refer to FIG. 50 for the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of the present embodiment.

The distance from the object-side surface 1211 of the first lens element 1210 to the image plane 1280 along the optical axis is 3.341 mm and the length of the optical imaging lens 12 is shortened compared with conventional optical imaging lenses. Thus, the optical imaging lens 12 is capable to provide excellent imaging quality for smaller sized mobile devices.

As shown in FIG. 47, the optical imaging lens 12 of the present embodiment shows great characteristics in longitudinal spherical aberration (a), astigmatism in the sagittal direction (b), astigmatism in the tangential direction (c), and distortion aberration (d). The present embodiment shows a better characteristics in the astigmatism in the sagittal direction (b), astigmatism in the tangential direction (c), which are within ±0.1 mm. Therefore, according to the above illustration, the optical imaging lens of the present embodiment indeed shows great optical performance and the length of the optical imaging lens 12 is effectively shortened.

Please refer to FIG. 50, which shows the values of T1, G12, T2, G23, T3, G34, T4, G45, T5, G56, T6, G6F, TF, GFP, EFL, AAG, ALT, BFL, TTL, AAG/T1, T6/(G34+G56), AAG/T3, T5/(G34+G56), ALT/AAG, T3/(G34+G56), T2/T4, T2/G12, (G23+G45)/T1, T2/AAG, ALT/(G34+G56), AAG/T5, G12/T1, T6/T4, T1/T4, T6/G12, T5/T4 and T5/G12 of all twelve embodiments, and it is clear that the optical imaging lens of the present invention satisfy the Equations (1), (2), (3), (4), (5), (6), (7), (8)/(8'), (9), (10), (11), (12), (13), (14), (15), (16), (17) and/or (18).

Figure 51:
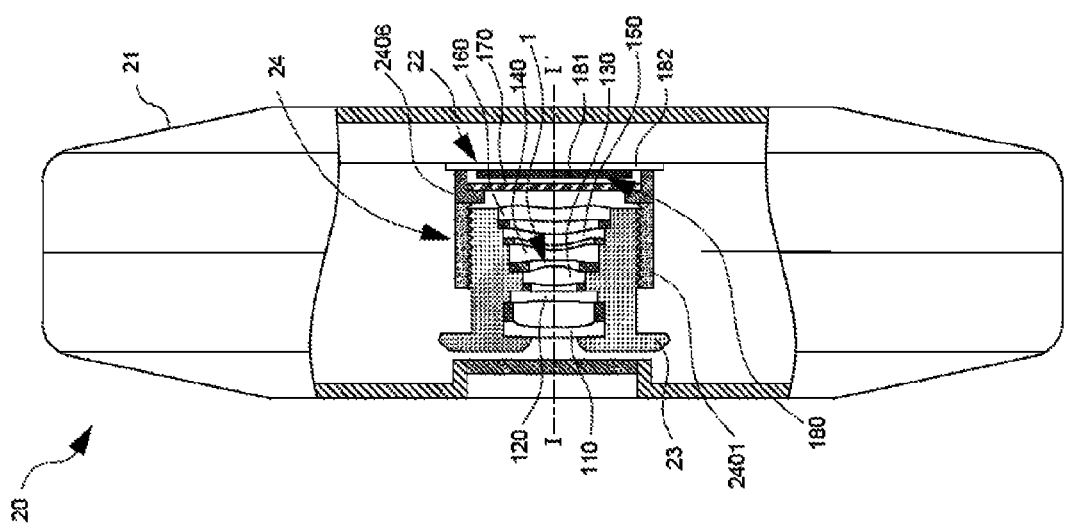
FIG. 51 is a structure of an example embodiment of a mobile device.

Reference is now made to FIG. 51, which illustrates an example structural view of a first embodiment of mobile device 20 applying an aforesaid optical imaging lens. The mobile device 20 comprises a housing 21 and a photography module 22 positioned in the housing 21. Examples of the mobile device 20 may be, but are not limited to, mobile phones, tablet computers, personal digital assistants (PDA), gaming machines, such as video game consoles, handhold game console, etc., environmental monitors, event data recorders, reversing camera systems mounted on motor vehicles, wide-angle camera, etc.

As shown in FIG. 51, the photography module 22 may comprise an aforesaid optical imaging lens with six lens elements, which is a prime lens and for example the optical imaging lens 1 of the first embodiment, a lens barrel 23 for positioning the optical imaging lens 1, a module housing unit 24 for positioning the lens barrel 23, a substrate 182 for positioning the module housing unit 24, and an image sensor 181 which is positioned at an image side of the optical imaging lens 1. The image plane 180 is formed on the image sensor 181.

In some other example embodiments, an additional filtering unit may be positioned in the optical imaging lens 1 for absorbing light with specific wavelength from the light passing optical imaging lens 1. In some example embodiments, the housing 21, the lens barrel 23, and/or the module housing unit 24 may be integrated into a single component or assembled by multiple components. In some example embodiments, the image sensor 181 used in the present embodiment is directly attached to a substrate 182 in the form of a chip on board (COB) package, and such package is different from traditional chip scale packages (CSP) since COB package does not require a cover glass before the image sensor 181 in the optical imaging lens 1. Aforesaid exemplary embodiments are not limited to this package type and could be selectively incorporated in other described embodiments.

An air gap is formed between any two adjacent lens elements of the six lens elements 110, 120, 130, 140, 150, 160, positioned in the lens barrel 23.

The module housing unit 24 comprises a lens backseat 2401 for positioning the lens barrel 23 and an image sensor base 2406 positioned between the lens backseat 2401 and the image sensor 181. The lens barrel 23 and the lens backseat 2401 are positioned along a same axis I-I', and the lens backseat 2401 is positioned at the inside of the lens barrel 23. The image sensor base 2406 is exemplarily close to the lens backseat 2401 here. The image sensor base 2406 could be optionally omitted in some other embodiments of the present invention.

Because the length of the optical imaging lens 1 is merely 4.045 mm, the size of the mobile device 20 may be quite small. Therefore, the embodiments described herein meet the market demand for smaller sized product designs.

Figure 52:
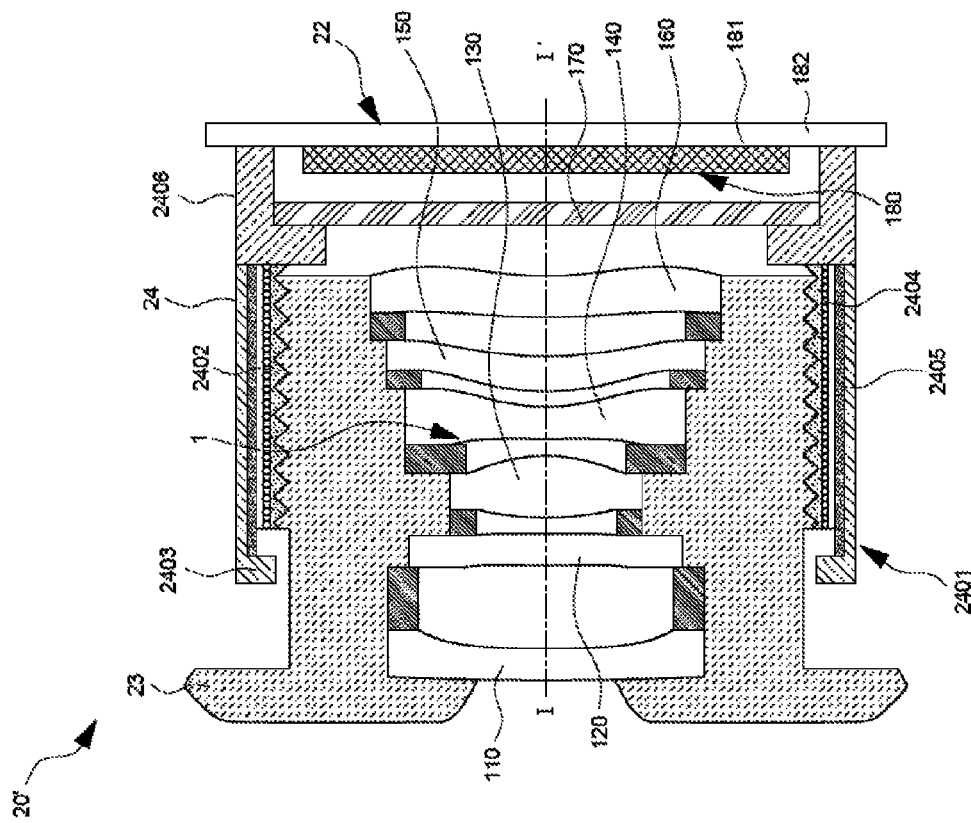
FIG. 52 is a partially enlarged view of the structure of another example embodiment of a mobile device.

Reference is now made to FIG. 52, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the outside of the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1, 4.045 mm, is shortened, the mobile device 20' may be designed with a smaller size and meanwhile good optical performance is still provided. Therefore, the present embodiment meets the demand of small sized product design and the request of the market.

According to above illustration, it is clear that the camera device and the optical imaging lens thereof in example embodiments, through controlling the detail structure of the lens elements, the length of the optical imaging lens is effectively shortened and meanwhile good optical characters are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising a first lens element, a second lens element, an aperture stop, a third lens element, a fourth lens element, a fifth lens element and a sixth lens element, each of said first, second, third, fourth, fifth and sixth lens elements having refractive power, an object-side surface facing toward the object side and an image-side surface facing toward the image side and a central thickness defined along the optical axis, wherein:

said first lens element has negative refractive power, said object-side surface of said first lens element comprises a convex portion in a vicinity of a periphery of said first lens element, and said image-side surface of said first lens element comprises a concave portion in a vicinity of the optical axis;

said second lens element made of plastic;

said object-side surface of said third lens element comprises a convex portion in a vicinity of the optical axis;

said image-side surface of said fourth lens element comprises a convex portion in a vicinity of a periphery of the fourth lens element;

said object-side surface of said fifth lens element comprises a convex portion in a vicinity of the optical axis;

said image-side surface of said sixth lens element comprises a convex portion in a vicinity of a periphery of the sixth lens element and made of plastic; and said optical imaging lens comprises no other lenses having refractive power beyond the six lens elements, and wherein the central thickness of the first lens element along the optical axis is T1, a sum of all five air gaps from the first lens element to the sixth lens element along the optical axis is AAG, and T1 and AAG satisfy the equation: $AAG/T1 \leq 15$.

2. The optical imaging lens according to claim 1, wherein the central thickness of the sixth lens element along the optical axis is T6, an air gap between the third lens element and the fourth lens element along the optical axis is G34, an air gap between the fifth lens element and the sixth lens element along the optical axis is G56, and T6, G34 and G56 satisfy the equation: $T6/(G34+G56) \leq 20$.

3. The optical imaging lens according to claim 2, wherein the central thickness of the third lens element along the optical axis is T3, and CT3 and AAG satisfy the equation: $AAG/T3 \leq 2.8$.

4. The optical imaging lens according to claim 1, wherein the central thickness of the fifth lens element along the optical axis is T5, an air gap between the third lens element and the fourth lens element along the optical axis is G34, an air gap between the fifth lens element and the sixth lens element along the optical axis is G56, and T5, G34 and G56 satisfy the equation: $T5/(G34+G56) \leq 5.75$.

5. The optical imaging lens according to claim 4, wherein a sum of the thickness of all six lens elements along the optical axis is ALT, and ALT and AAG satisfy the equation: $2.2 \leq ALT/AAG$.

6. The optical imaging lens according to claim 1, wherein the central thickness of the third lens element along the optical axis is T3, an air gap between the third lens element and the fourth lens element along the optical axis is G34, an air gap between the fifth lens element and the sixth lens element along the optical axis is G56, and T3, G34 and G56 satisfy the equation: $T3/(G34+G56) \leq 12$.

7. The optical imaging lens according to claim 6, wherein the central thickness of the second lens element along the optical axis is T2, the central thickness of the fourth lens element along the optical axis is T4, and T2 and T4 satisfy the equation: $0.66 \leq T2/T4$.

8. The optical imaging lens according to claim 1, wherein the central thickness of the second lens element along the optical axis is T2, an air gap between the first lens element and the second lens element along the optical axis is G12, and T2, and G12 satisfy the equation: $T2/G12 \leq 1.75$.

9. The optical imaging lens according to claim 8, wherein an air gap between the second lens element and the third lens element along the optical axis is G23, an air gap between the fourth lens element and the fifth lens element along the optical axis is G45, and T1, G23 and G45 satisfy the equation: $0.27 \leq (G23+G45)/T1 \leq 2$.

10. The optical imaging lens according to claim 1, wherein the central thickness of the second lens element along the optical axis is T2, and T2 and AAG satisfy the equation: $T2/AAG \leq 1.1$.

11. The optical imaging lens according to claim 10, wherein an air gap between the third lens element and the fourth lens element along the optical axis is G34, an air gap between the fifth lens element and the sixth lens element along the optical axis is G56, a sum of the thickness of all six lens elements along the optical axis is ALT, and G34, G56 and ALT satisfy the equation: $6.5 \leq ALT/(G34+G56)$.

12. The optical imaging lens according to claim 1, wherein the central thickness of the fifth lens element along the optical axis is T5, and T5 and AAG satisfy the equation: $AAG/T5 \leq 8$.

13. The optical imaging lens according to claim 12, wherein the central thickness of the second lens element along the optical axis is T2, an air gap between the first lens element and the second lens element along the optical axis is G12, and T2 and G12 satisfy the equation: $0.35 \leq T2/G12 \leq 1.75$.

14. The optical imaging lens according to claim 1, wherein an air gap between the first lens element and the second lens element along the optical axis is G12, and T1 and G12 satisfy the equation: $G12/T1 \leq 1.88$.

15. The optical imaging lens according to claim 14, wherein the central thickness of the fourth lens element along the optical axis is T4, the central thickness of the sixth lens element along the optical axis is T6, and T4 and T6 satisfy the equation: $1.25 \leq T6/T4$.

16. The optical imaging lens according to claim 1, wherein the central thickness of the fourth lens element along the optical axis is T4, and T1 and T4 satisfy the equation: $0.67 \leq T1/T4$.

17. The optical imaging lens according to claim 16, wherein the central thickness of the sixth lens element along the optical axis is T6, an air gap between the first lens element and the second lens element along the optical axis is G12, and T6 and G12 satisfy the equation: $1 \leq T6/G12$.

18. The optical imaging lens according to claim 1, wherein the central thickness of the fourth lens element along the optical axis is T4, the central thickness of the fifth lens element along the optical axis is T5, and T4 and T5 satisfy the equation: $0.6 \leq T5/T4$.

19. The optical imaging lens according to claim 1, wherein the central thickness of the fifth lens element along the optical axis is T5, an air gap between the first lens element and the second lens element along the optical axis is G12, and T5 and G12 satisfy the equation: $0.5 \leq T5/G12$.

20. A mobile device, comprising:
a housing; and
a photography module positioned in the housing and comprising:
an optical imaging lens, sequentially from an object side to an image side along an optical axis, comprising a first lens element, a second lens element, an aperture stop, a third lens element, a fourth lens element, a fifth lens element and a sixth lens element, each of said first, second, third, fourth, fifth and sixth lens elements having refractive power, an object-side surface facing toward the object side and an image-side surface facing toward the image side and a central thickness defined along the optical axis, wherein:
said first lens element has negative refractive power, said object-side surface of said first lens element comprises a convex portion in a vicinity of a periphery of said first lens element, and said image-side surface of said first lens element comprises a concave portion in a vicinity of the optical axis;
said second lens element made of plastic;
said object-side surface of said third lens element comprises a convex portion in a vicinity of the optical axis;
said image-side surface of said fourth lens element comprises a convex portion in a vicinity of a periphery of the fourth lens element;
said object-side surface of said fifth lens element comprises a convex portion in a vicinity of the optical axis;
said image-side surface of said sixth lens element comprises a convex portion in a vicinity of a periphery of the sixth lens element and made of plastic; and
said optical imaging lens comprises no other lenses having refractive power beyond the six lens elements, and wherein the central thickness of the first lens element along the optical axis is T1, a sum of all five air gaps from the first lens element to the sixth lens element along the optical axis is AAG, and T1 and AAG satisfy the equation: AAG/T1≤15; and
a lens barrel for positioning the optical imaging lens;
a module housing unit for positioning the lens barrel; and
an image sensor positioned at the image side of the optical imaging lens.

* * * * *